US008860738B2

(12) United States Patent
Endo

(10) Patent No.: US 8,860,738 B2
(45) Date of Patent: Oct. 14, 2014

(54) IMAGE PROCESSING CIRCUIT, DISPLAY DEVICE, AND ELECTRONIC DEVICE

(75) Inventor: Masami Endo, Kanagawa (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 1042 days.

(21) Appl. No.: 12/639,233

(22) Filed: Dec. 16, 2009

(65) Prior Publication Data

US 2010/0156914 A1 Jun. 24, 2010

(30) Foreign Application Priority Data

Dec. 24, 2008 (JP) ................................ 2008-327281

(51) Int. Cl.

| | |
|---|---|
| ***G06T 1/00*** | (2006.01) |
| ***G06T 15/00*** | (2011.01) |
| ***G09G 5/36*** | (2006.01) |
| ***G09G 5/39*** | (2006.01) |
| ***G09G 3/20*** | (2006.01) |

(52) U.S. Cl.

CPC .. *G09G 3/20* (2013.01); *G09G 5/39* (2013.01); *G09G 2360/12* (2013.01)

USPC ........... 345/522; 345/531; 345/558; 345/560; 348/222.1

(58) Field of Classification Search

None

See application file for complete search history.

(56) References Cited

U.S. PATENT DOCUMENTS

| | | | | |
|---|---|---|---|---|
| 5,646,745 | A | 7/1997 | Kajitani et al. | |
| 5,838,826 | A | 11/1998 | Enari et al. | |
| 6,559,976 | B1 | 5/2003 | Hirota | |
| 6,784,887 | B1 | 8/2004 | Tourai | |
| 6,876,395 | B1 * | 4/2005 | Muto et al. | 348/441 |
| 7,199,897 | B2 | 4/2007 | Nomizu | |
| 7,259,739 | B2 | 8/2007 | Yun et al. | |
| 7,598,984 | B2 | 10/2009 | Tokuyama | |
| 2002/0130974 | A1 | 9/2002 | Kimura et al. | |
| 2003/0132977 | A1 * | 7/2003 | Moto et al. | 347/14 |
| 2005/0104982 | A1 * | 5/2005 | Shimazu et al. | 348/294 |

FOREIGN PATENT DOCUMENTS

| | | | |
|---|---|---|---|
| JP | 10-322666 | A | 12/1998 |
| JP | 2000-032278 | A | 1/2000 |
| JP | 2006-217007 | A | 8/2006 |
| JP | 2007-006133 | A | 1/2007 |

* cited by examiner

*Primary Examiner* — Tize Ma

(74) *Attorney, Agent, or Firm* — Fish & Richardson P.C.

(57) ABSTRACT

An object is to provide an image processing circuit adaptable to displays having a variety of pixel numbers. The image processing circuit includes a data adjustment circuit, a first line memory and a second line memory capable of storing K pieces of data, an output timing control circuit, and an arithmetic circuit. To the data adjustment circuit, (X×Y) pieces of pixel data are input. Y pieces of pixel data are transmitted to the first line memory. When Y is less than K, (K−Y) pieces of dummy data are added to fill the first line memory. Then, the K pieces of data are output from the first line memory to the second line memory and a new set of K data is input to the first line memory. The arithmetic circuit stores the data input from the line memories and performs filtering.

19 Claims, 15 Drawing Sheets

IMAGE PROCESSING CIRCUIT, DISPLAY DEVICE, AND ELECTRONIC DEVICE

BACKGROUND OF THE INVENTION

1. Field of the Invention

The present invention relates to an image processing circuit which performs a filter process. In addition, the present invention relates to a display device including the image processing circuit. Further, the present invention relates to an electronic device including the display device in a display portion.

2. Description of the Related Art

The quality of display images, for example, of display devices such as liquid crystal display devices (also referred to as LCDs) and EL display devices (also referred to as electroluminescent display devices) can be improved by image processing.

As an example of the image processing, a filter process (also referred to as filtering) which is also performed in devices such as scanners and printers can be given. The filter process is an arithmetic process which weights each pixel data value by using a matrix of a weighting coefficient called a filter and calculates the sum of the pixel data values. By the filter process, processing such as image averaging, image enhancement, edge detection, or detection of a certain pattern can be performed.

As an example of a device having an image processing function including the filter process (such a device is also referred to as an image processing circuit or an image processing device), Patent Document 1 can be given.

An image processing device (image processing circuit) disclosed in Patent Document 1 performs an edge detection process and a filter process by using a plurality of line memories connected to each other in series.

The line memory is a memory which can store pixel data corresponding to pixels in one row.

REFERENCE

Patent Document

[Patent Document 1] Japanese Published Patent Application No. 2007-006133

SUMMARY OF THE INVENTION

However, since conventional image processing circuits are designed according to the number of pixels in display devices to which the image processing circuits are mounted, it is difficult to apply an image processing circuit designed for one display device to another display device. Therefore, there is a problem in that the versatility of the conventional image processing circuit is poor.

In view of the foregoing problem, it is an object of the present invention to improve the versatility of an image processing circuit by making it easy to be applied to a plurality of display devices with different specifications.

According to one embodiment of the present invention, an image processing circuit has a structure in which pixel data is output to an arithmetic circuit by using the arithmetic circuit, which performs a filter process, and a plurality of line memories electrically connected to each other.

Further, according to one embodiment of the present invention, the image processing circuit includes a circuit which outputs dummy data as well as pixel data in accordance with the number of pixel data to be input and adjusts the data.

According to one embodiment of the present invention, an image processing circuit includes a data adjustment circuit, a first line memory, a second line memory, an output timing control circuit, and an arithmetic circuit. The data adjustment circuit sequentially outputs (X×Y) (X and Y are natural numbers) pieces of pixel data corresponding to respective pixels in X rows and Y columns as output data in order from pixel data corresponding to pixels in a first row to pixel data corresponding to pixels in each row and outputs (K−Y) (K is a natural number greater than or equal to Y) pieces of dummy data every time the pixel data corresponding to the pixels in each row is output, when Y is less than K. The first line memory is capable of storing K pieces of the pixel data and outputs the pixel data or the dummy data input from the data adjustment circuit after storing the pixel data or the dummy data for a certain period of time. The second line memory is capable of storing the K pieces of the pixel data and outputs the pixel data or the dummy data input from the first line memory after storing the pixel data or the dummy data for a certain period of time. The arithmetic circuit stores the pixel data input from the first line memory and the second line memory through the output timing control circuit for a certain period of time and performs a filter process by using the stored pixel data.

In addition, the data adjustment circuit can include a counting circuit for counting the number of the pixel data.

In addition, the first line memory and the second line memory each include sequential logic circuits of K stages electrically connected to each other.

In addition, the filter process can be a process using any one of a differential filter, an integral filter, and a Laplacian filter.

In addition, the pixel data and the dummy data can be digital data.

In addition, the dummy data is any of input pixel data.

According to one embodiment of the present invention, a display device includes the image processing circuit according to one embodiment of the present invention; a control circuit electrically connected to the image processing circuit; a scan line driver circuit and a signal line driver circuit which are electrically connected to the control circuit; and a pixel portion including a pixel electrically connected to the scan line driver circuit and the signal line driver circuit.

According to one embodiment of the present invention, an electronic device includes the display device according to one embodiment of the present invention in a display portion.

Note that in this specification, terms with ordinal numbers, such as "first" and "second", are used in order to avoid confusion among components, and the terms do not limit the components numerically.

Since a filter process can be performed by using pixel data which corresponds to pixels adjacent to each other in the row direction and the column direction regardless of the number of pixel data to be input, an image processing circuit can be easily applied to a plurality of display devices with different specifications, whereby the versatility of the image processing circuit can be improved.

DETAILED DESCRIPTION OF THE INVENTION

Hereinafter, embodiments of the present invention will be described with reference to the drawings. However, the present invention is not limited to explanation to be given below, and it is to be easily understood that modes and details thereof can be variously modified without departing from the purpose and the scope of the present invention. Therefore, the present invention should not be interpreted as being limited to the description of the embodiments to be given below.

Embodiment 1

In this embodiment, an image processing circuit according to one embodiment of the present invention is described.

Figure 1A:
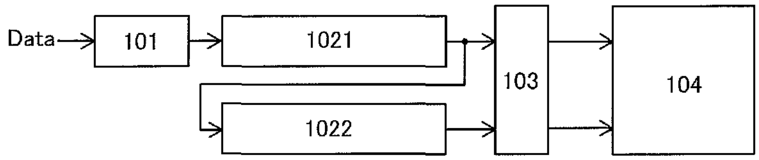
FIGS. 1A and 1B are block diagrams each illustrating an example of a structure of an image processing circuit in Embodiment 1.
Figure 1B:
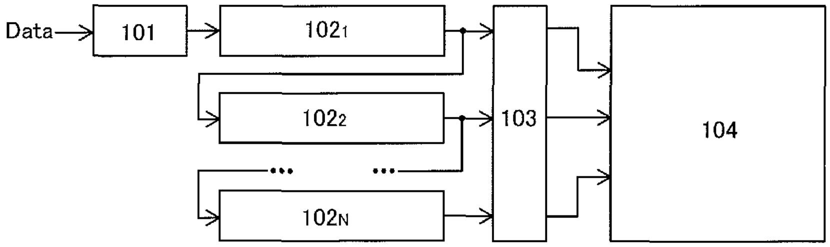

A structure of the image processing circuit in this embodiment will be described with reference to FIGS. 1A and 1B. FIGS. 1A and 1B are block diagrams each illustrating an example of the structure of the image processing circuit in this embodiment.

The image processing circuit shown in FIG. 1A includes a data adjustment circuit 101, a line memory 1021, a line memory 1022, an output timing control circuit 103, and an arithmetic circuit 104.

The data adjustment circuit 101 adjusts data which is output in accordance with pixel data to be input (such data is also referred to as output data).

The pixel data input to the data adjustment circuit 101 is (X×Y) (X and Y are natural numbers) pieces of pixel data corresponding to respective pixels in X rows and Y columns. For example, in the case where the pixel data input is digital data, one piece of pixel data can be represented by a data amount of $2^A$ (A is a natural number) bits. Note that in this specification, (X×Y) pieces of pixel data is also collectively referred to as image data. For example, the image data is input to the data adjustment circuit 101 as an image signal. The data adjustment circuit 101 adjusts data by outputting dummy data as well as pixel data in accordance with the number of columns (Y) of the pixel data to be input.

The data adjustment circuit 101 can be formed by combining, for example, logic circuits such as a counting circuit and a memory circuit.

In addition, the dummy data is data with the same format as the pixel data. In the case where the pixel data is digital data, for example, the dummy data is represented by a data amount of $2^A$ (A is a natural number) bits like the pixel data. As the dummy data, for example, data of only 0, data of only 1, or the like can be used. The data of only 0 or the data of only 1 can be used by being stored in a memory or the like in advance, for example. Alternatively, since the state of a signal is represented by only 0 or 1 during an interval between a period of sending pixel data in one line and a period of sending pixel data in the next line, the state of the signal during the interval between the period of sending pixel data in one line and the period of sending pixel data in the next line can be used as dummy data. Alternatively, data other than the data of only 0 or 1 can also be used as the dummy data. For example, any of the pixel data can be used as the dummy data.

In addition, the pixel data or the dummy data is also simply referred to as data in this specification.

The line memory 1021 and the line memory 1022 are memories each designed in advance so as to be able to store K (K is a natural number more than or equal to Y) pieces of pixel data among pixel data input. For example, in the case where K=Y, all the data stored in the line memory 1021 and the line memory 1022 are pixel data. On the other hand, in the case where K>Y, Y pieces of pixel data and (K−Y) pieces of dummy data for shortfall pixel data are stored.

The line memory 1021 includes an input terminal and an output terminal. The input terminal of the line memory 1021 is electrically connected to the data adjustment circuit 101.

The line memory 1022 includes an input terminal and an output terminal. The input terminal of the line memory 1022 is electrically connected to the output terminal of the line memory 1021.

Note that each of the line memory 1021 and the line memory 1022 can be formed by using, for example, sequential logic circuits of a plurality of stages. For example, by providing sequential logic circuits of K stages, one pixel data or one dummy data per sequential logic circuit of one stage can be stored. Further, data stored in each sequential logic circuit is replaced with different data every certain period. That is, during a given period, data stored in a sequential logic circuit of a first stage is input to a sequential logic circuit of the next stage every certain period and stored in it for a certain period of time and further output to a sequential logic circuit of a stage which follows the previous stage.

In addition, although FIG. 1A shows the case where the image processing circuit includes two line memories, this embodiment is not limited to this. The image processing circuit in this embodiment may include at least two or more line memories. For example, as shown in FIG. 1B, N line memories electrically connected to each other in series can be included as line memories $\mathbf{102}_1$ to $\mathbf{102}_N$ (N is a natural number of more than or equal to 2). At that time, the line memory $\mathbf{102}_N$ includes an input terminal and an output terminal. The input terminal of the line memory $\mathbf{102}_N$ is electrically connected to an output terminal of a line memory $\mathbf{102}_{N-1}$.

The output timing control circuit 103 controls a timing of outputting data stored in the line memory 1021 and the line memory 1022 to the arithmetic circuit 104. The timing of outputting data from each of the line memory 1021 and the line memory 1022 to the arithmetic circuit 104 preferably comes up after any of pixel data which is input as much as possible to be stored is stored in the line memory 1021 and the line memory 1022. Since the image data is sequentially output from each of the line memory 1021 and the line memory 1022 to the arithmetic circuit 104 at that timing, the pixel data output from the line memory 1022 to the arithmetic circuit 104 is pixel data related to pixels in a row next to a row of pixels to which the pixel data output from the line memory 1021 to the arithmetic circuit 104 is related. Therefore, pixel data adjacent to each other in the column direction is input to the arithmetic circuit 104 every certain period.

As the output timing control circuit 103, for example, a selector circuit or the like can be used. At that time, the timing of outputting the data from each of the line memory 1021 and the line memory 1022 to the arithmetic circuit 104 can be set as appropriate in accordance with a pulse of a clock signal, for example.

The arithmetic circuit 104 stores data input from each line memory every certain period and performs a filter process by using the data stored. As the filter process, for example, a process using a differential filter, an integral filter, a Laplacian filter, or the like is given. For example, a moving average filter process, a Gaussian smoothing filter process, a Gaussian differential filter process, a high-emphasis filter process, an edge filter process, a mosaic process, or the like can be performed.

Next, operation of the image processing circuit illustrated in FIGS. 1A and 1B is described.

First, (X×Y) pieces of pixel data corresponding to pixels in X rows and Y columns are input to the data adjustment circuit 101.

The data adjustment circuit 101 calculates the number of rows (X) and the number of columns (Y) of the pixels based on the input pixel data.

At that time, in the case where Y is equal to the number K of pixel data which can be stored per one line memory, that is, in the case where Y=K, the input pixel data in each row is sequentially output as output data in order from pixel data in a first row.

Alternatively, in the case where Y is smaller than the number K of pixel data which can be stored per one line memory, that is, in the case where Y<K, the input pixel data in each row is sequentially output as the output data in order from the pixel data in the first row and (K−Y) pieces of dummy data are sequentially output every time the pixel data in each row is output.

The output data output from the data adjustment circuit 101 is input to the line memory 1021.

The line memory 1021 outputs the pixel data or the dummy data input from the data adjustment circuit 101 after storing the pixel data or the dummy data for a certain period of time.

The pixel data or the dummy data output from the line memory 1021 is input to the line memory 1022.

The line memory 1022 outputs the pixel data or the dummy data input from the line memory 1021 after storing the pixel data or the dummy data for a certain period of time.

In addition, the pixel data is sequentially input from each of the line memory 1021 and the line memory 1022 to the arithmetic circuit 104 in accordance with the output timing control circuit 103.

The arithmetic circuit 104 stores the pixel data input from the line memory 1021 and the line memory 1022 and performs a filter process by using the stored pixel data. The pixel data stored in the arithmetic circuit 104 corresponds to pixels adjacent to each other in the row direction and the column direction. In addition, the pixel data stored in the arithmetic circuit 104 is replaced with different pixel data every certain period, and a filter process is performed with a combination of pixel data which differs every period. Further, a filter circuit generates one image processing data every filter process. This is the operation of the image processing circuit shown in FIGS. 1A and 1B.

As shown in FIGS. 1A and 1B, as one example, the image processing circuit in this embodiment includes the data adjustment circuit and the plurality of line memories electrically connected to each other in series and has a structure in which each of the line memories is designed in advance so as to be able to store as much data as or more data than the number of pixel data corresponding to pixels in one row. In addition, in the case where the number of columns of the pixels corresponding to the pixel data input is smaller than the number of data which can be stored in one line memory, dummy data as well as the input pixel data are sequentially output to the line memory in accordance with the number of columns of the pixels. Accordingly, the same combination of the pixel data can be output from each line memory to the arithmetic circuit at one timing regardless of the number of columns of the pixels without separately providing an address selection circuit. Therefore, the arithmetic circuit can perform a filter process by using the pixel data corresponding to the pixels adjacent to each other in the row direction and the column direction. Thus, the image processing circuit can be easily applied to a plurality of display devices with different specifications and the versatility of the image processing circuit can be improved. Further, since the example of the image processing circuit in this embodiment has a structure in which an address selection circuit does not need to be separately provided, the number of wirings can be reduced.

Embodiment 2

In this embodiment, as an example of the image processing circuit according to one embodiment of the present invention, an image processing circuit which performs a filter process by using a matrix filter will be described.

Figure 2:
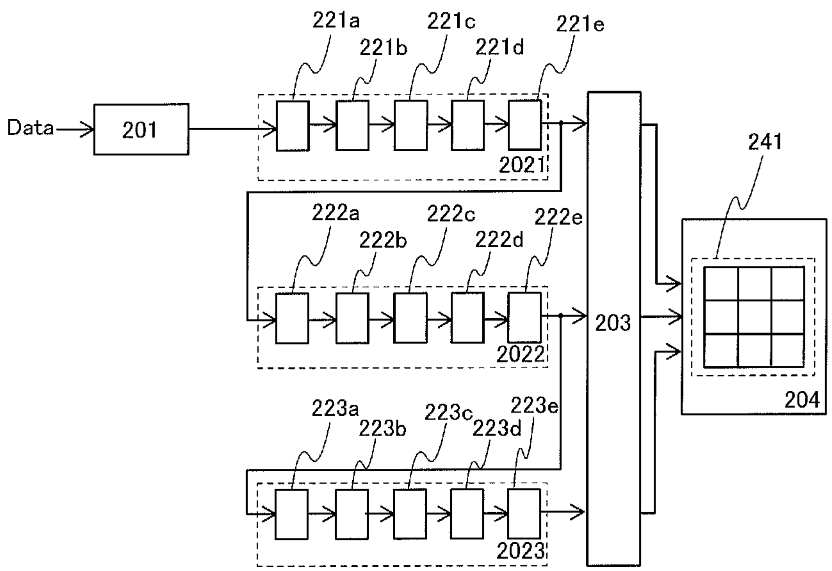
FIG. 2 is a block diagram illustrating an example of a structure of an image processing circuit in Embodiment 2.

The structure of the image processing circuit in this embodiment will be described with reference to FIG. 2. FIG. 2 is a block diagram illustrating an example of the structure of the image processing circuit in this embodiment.

The image processing circuit shown in FIG. 2 includes a data adjustment circuit 201, a line memory 2021, a line memory 2022, a line memory 2023, an output timing control circuit 203, and an arithmetic circuit 204.

The data adjustment circuit 201 adjusts output data in accordance with the number of pixel data to be input.

The pixel data input to the data adjustment circuit 201 is (X×Y) (X and Y are natural numbers) pieces of pixel data corresponding to respective pixels in X rows and Y columns. As the pixel data, digital data, for example, can be used. In the case where the pixel data input is the digital data, one piece of pixel data can be represented by a data amount of $2^A$ (A is a natural number) bits. For example, the image data is input to the data adjustment circuit 201 as an image signal. The data adjustment circuit 201 adjusts the output data by calculating the number of rows (X) and the number of columns (Y) of corresponding pixels by counting the input pixel data, and by outputting dummy data as well as pixel data in accordance with the calculated number of columns (Y).

The data adjustment circuit 201 includes at least a counting circuit. In addition, the data adjustment circuit can be formed using a plurality of combination logic circuits.

In addition, the dummy data is data with the same format as the pixel data. In the case where the pixel data is digital data, for example, the dummy data is represented by a data amount of $2^A$ (A is a natural number) bits like the pixel data. As the dummy data, for example, data of only 0, data of only 1, or the like can be used. The data of only 0 or the data of only 1 can be used by being stored in a memory or the like in advance, for example. Alternatively, since the state of a signal is represented by only 0 or 1 during an interval between a period of sending pixel data in one line and a period of sending pixel data in the next line, the state of the signal during the interval between a period of sending pixel data in one line and a period of sending pixel data in the next line can be used as dummy data. Alternatively, data other than the data of only 0 or 1 can also be used as the dummy data. For example, any of the pixel data can be used as the dummy data.

The line memories 2021 to 2023 are memories each designed in advance so as to be able to store K (K is a natural number more than or equal to Y) pieces of pixel data among pixel data input. For example, in the case where K=Y, all the data stored in the line memories 2021 to 2023 are pixel data. On the other hand, in the case where K>Y, Y pieces of pixel data and (K−Y) pieces of dummy data for shortfall pixel data are stored. Note that although the image processing circuit shown in FIG. 2 has a structure including three line memories electrically connected to each other in series, this embodiment is not limited to this. In the image processing circuit in this embodiment, the number of line memories is preferably set as appropriate. More specifically, the number of line memories is preferably set as appropriate, for example in accordance with specifications (the number of matrices of a filter, or the like) of the arithmetic circuit 204.

The line memory 2021 includes sequential logic circuits of five stages (a sequential logic circuit 221*a*, a sequential logic circuit 221*b*, a sequential logic circuit 221*c*, a sequential logic circuit 221*d*, and a sequential logic circuit 221*e*) electrically connected to each other in series. An input terminal of the sequential logic circuit 221*a* (also referred to as an input terminal of the line memory 2021) is electrically connected to the data adjustment circuit 201.

The line memory 2022 includes sequential logic circuits of five stages (a sequential logic circuit 222*a*, a sequential logic circuit 222*b*, a sequential logic circuit 222*c*, a sequential logic circuit 222*d*, and a sequential logic circuit 222*e*) electrically connected to each other in series. An input terminal of the sequential logic circuit 222*a* (also referred to as an input terminal of the line memory 2022) is electrically connected to an output terminal of the sequential logic circuit 221*e* (also referred to as an output terminal of the line memory 2021).

The line memory 2023 includes sequential logic circuits of five stages (a sequential logic circuit 223*a*, a sequential logic circuit 223*b*, a sequential logic circuit 223*c*, a sequential logic circuit 223*d*, and a sequential logic circuit 223*e*) electrically connected to each other in series. An input terminal of the sequential logic circuit 223*a* (also referred to as an input terminal of the line memory 2023) is electrically connected to an output terminal of the sequential logic circuit 222*e* (also referred to as an output terminal of the line memory 2022).

As the sequential logic circuit, for example, a flip-flop circuit such as a D-type flip-flop circuit, a T-type flip-flop circuit, or a JK-type flip-flop can be used.

Note that although each of the line memories 2021 to 2023 in the image processing circuit shown in FIG. 2 includes the sequential logic circuits of five stages, this embodiment is not limited to this. The image processing circuit in this embodiment may include, for example, sequential logic circuits of K stages in each line memory.

The output timing control circuit 203 controls a timing of outputting the pixel data stored in the line memories 2021 to 2023 to the arithmetic circuit 204 and is electrically connected to output terminals of the respective line memories 2021 to 2023, that is, the output terminal of the sequential logic circuit 221*e*, the output terminal of the sequential logic circuit 222*e*, and an output terminal of the sequential logic circuit 223*e*. Note that the timing of outputting the data from each of the line memories 2021 to 2023 to the arithmetic circuit 204 preferably comes up after any of pixel data is stored in each sequential logic circuit in the line memory 2023. Since the image data is sequentially output from each of the line memories 2021 to 2023 to the arithmetic circuit 204 at that timing, the pixel data output from the line memories 2021 to 2023 is related to pixels in three adjacent rows which are different from each other. Therefore, pixel data adjacent to each other in the column direction is input to the arithmetic circuit 204 every certain period.

As the output timing control circuit 203, for example, a selector circuit or the like can be used. At that time, the timing of outputting the data from each of the line memories 2021 to 2023 to the arithmetic circuit 204 can be set as appropriate in accordance with a pulse of a clock signal, for example.

In addition, the timing of outputting the pixel data or the dummy data from each of the line memories 2021 to 2023 to the arithmetic circuit 204 can be set as appropriate in accordance with a pulse of a clock signal, for example. As the output timing control circuit 203, for example, a selector circuit or the like can be used.

The arithmetic circuit 204 is electrically connected to the output timing control circuit 203. The pixel data or the dummy data is input to the arithmetic circuit 204 from the line memories 2021 to 2023 through the output timing control circuit 203. In addition, the arithmetic circuit 204 includes a filter 241 which is a filter with a 3×3 matrix of weighting coefficients, stores 3×3 pieces of data corresponding to the pixels adjacent to each other among the input pixel data for a certain period of time, and performs a filter process by using the stored 3×3 pieces of data. The pixel data stored in the arithmetic circuit 204 is replaced with data which is additionally input every certain period.

As the filter process, for example, a process using a differential filter, an integral filter, a Laplacian filter, or the like is given. For example, a moving average filter process, a Gaussian smoothing filter process, a Gaussian differential filter process, a high-emphasis filter process, an edge filter process, a mosaic process, or the like can be performed. Although the image processing circuit shown in FIG. 2 performs the filter process by using the filter 241 with a 3×3 matrix of the weighting coefficients, for example, this embodiment is not limited to this. The number of cells in the matrix of the weighting coefficients can be set as appropriate in the image processing circuit in this embodiment.

Next, operation of the image processing circuit illustrated in FIG. 2 is described.

First, (X×Y) pieces of pixel data corresponding to pixels in X rows and Y columns are sequentially input to the data adjustment circuit 201.

Figure 3:
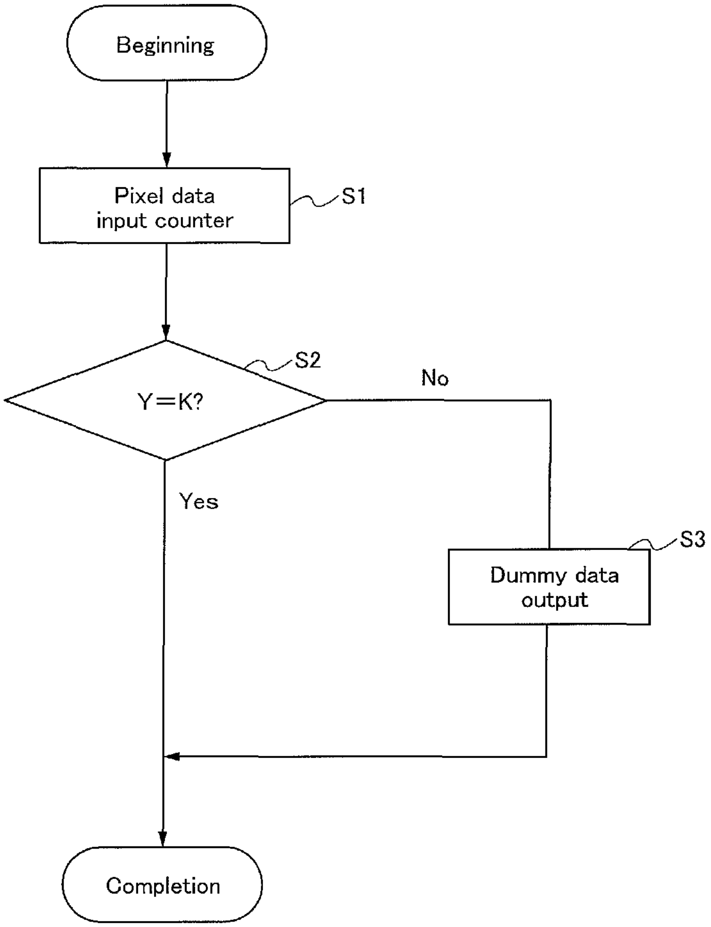
FIG. 3 is a flow chart illustrating operation of a data adjustment circuit shown in FIG. 2.

Next, an example of operation of the data adjustment circuit 201 is described with reference to FIG. 3. FIG. 3 is a flow chart illustrating the operation of the data adjustment circuit shown in FIG. 2.

As shown in FIG. 3, as the first step (S1 in FIG. 3) after the beginning, the data adjustment circuit 201 counts the number of pixel data input and calculates values of the number of rows (X) and the number of columns (Y) corresponding to the input pixel data. For example, the number of columns can be calculated by counting the number of pixel data input in one horizontal synchronization period determined based on a horizontal synchronization signal (also referred to as an HSYNC) and the number of rows can be calculated by counting how many times the pixel data for one column is input in one vertical synchronization period determined based on a vertical synchronization signal (also referred to as an VSYNC). Note that the cycles of pulses of the horizontal synchronization signal and the vertical synchronization signal can be set as appropriate.

Further, the data adjustment circuit 201 adjusts the pixel data input in accordance with the number of rows and the number of columns calculated and outputs the adjusted pixel data as output data. At that time, the output data is set by judging whether the number of columns of pixels input is less than or equal to K (K is a natural number more than or equal to Y) as a second step (S2 in FIG. 3). The judging process can be performed by setting the maximum counting value of data counted in one horizontal synchronization period, for example, K, and judging whether Y is equal to or less than K in accordance with how many pixel data are included in the counted K pieces of data. Note that K is the number of data which can be stored in one line memory. In the case of the image processing circuit shown in FIG. 2, K is 5. Output data in each case will be described below.

First, in the case where Y=5, (X×Y) pieces of pixel data corresponding to the pixels in X rows and Y columns are sequentially output as output data in order from pixel data corresponding to pixels in a first row to pixel data in each row, and the operation is completed.

On the other hand, in the case where Y<5, as a third step (S3 in FIG. 3), (X×Y) pieces of pixel data corresponding to the pixels in X rows and Y columns are sequentially output as output data in order from pixel data corresponding to pixels in a first row to pixel data in each row and (5−Y) pieces of dummy data are sequentially output every time the pixel data in each row is output. Accordingly, the operation is completed.

Note that when any of the pixel data is used as the dummy data, for example, (X×Y) pieces of pixel data corresponding to the pixels in X rows and Y columns are sequentially output as output data in order from pixel data corresponding to pixels in a first row to pixel data in each row, and further, (5−Y) pieces of pixel data, which are the same as pixel data which is input last in each row, are sequentially output every time the pixel data corresponding to the pixels in each row is output.

Figure 4:
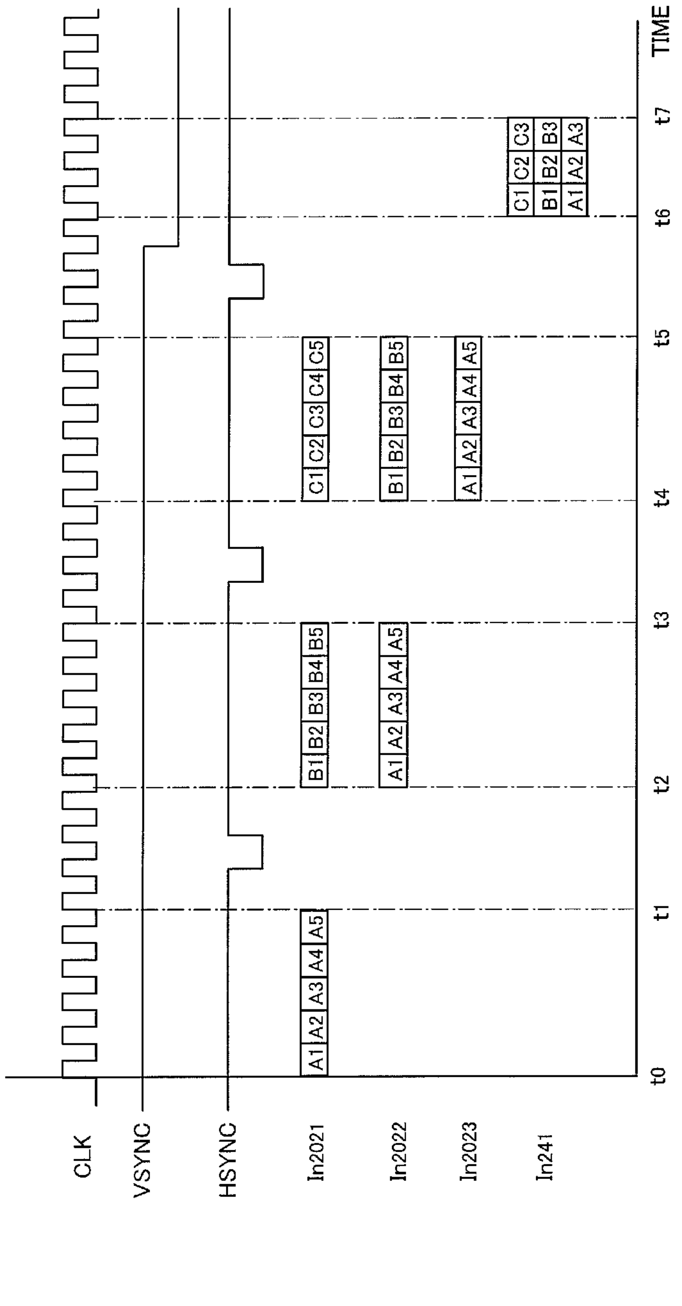
FIG. 4 is a timing chart illustrating operation of the image processing circuit shown in FIG. 2.

Next, operation of each of the line memories 2021 to 2023, the output timing control circuit 203, and the arithmetic circuit 204 is described with reference to FIG. 4, FIGS. 5A and 5B, and FIGS. 6A and 6B. FIG. 4 is a timing chart illustrating the operation of the image processing circuit shown in FIG. 2, and FIGS. 5A and 5B and FIGS. 6A and 6B are diagrams illustrating the operation of the image processing circuit shown in FIG. 2.

As shown in FIG. 4, the output data output from the data adjustment circuit 201 is input to the line memory 2021 (see $In_{2021}$). Here, for example, the output data includes 3×3 pieces of pixel data and 2×3 pieces of dummy data. As shown in FIG. 4, these pixel data and dummy data are input to the line memory 2021 in the following order: pixel data corresponding to the pixels in the first row (data A1 to A3) and two dummy data (obtained by K−Y=5−3=2) (data A4 and A5); pixel data corresponding to pixels in a second row (data B1 to B3) and two dummy data (data B4 and B5); and pixel data corresponding to pixels in a third row (data C1 to C3) and two dummy data (data C4 and C5).

In accordance with a clock signal (CLK), the line memory 2021 stores the data input from the data adjustment circuit 201 for a certain period of time and outputs the data. For example, as shown in FIG. 4, in response to the clock signal, the data A1 input to the sequential logic circuit 221*a* after a time t0 is shifted to and stored in the sequential logic circuit 221*a*, the sequential logic circuit 221*b*, the sequential logic circuit 221*c*, the sequential logic circuit 221*d*, and the sequential logic circuit 221*e* for a certain period of time in this order. Then, the data A1 is output from the sequential logic circuit 221*e*. Note that a pulse of the clock signal can be set as appropriate.

Figure 5A:
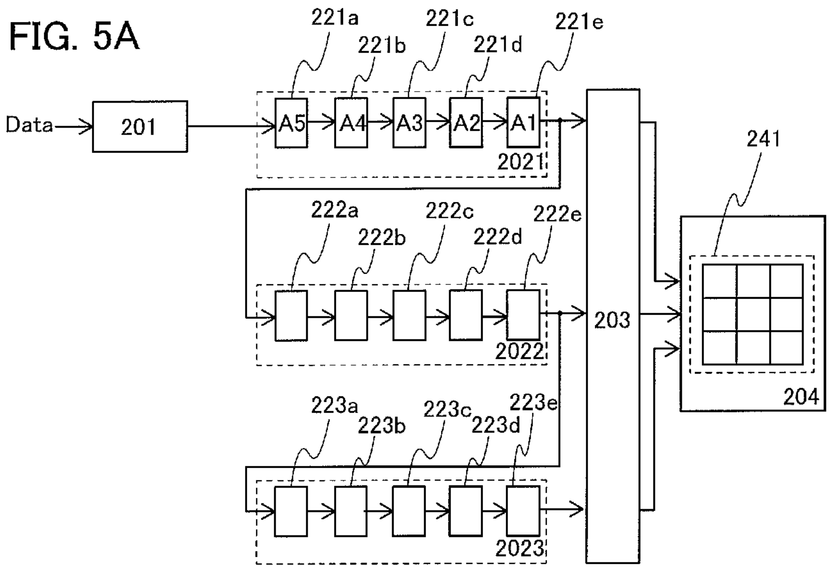
FIGS. 5A and 5B are block diagrams each illustrating operation of the image processing circuit shown in FIG. 2.

In addition, FIG. 5A shows the state of the image processing circuit in a time t1. As shown in FIG. 5A, in the time t1, the data A1 is stored in the sequential logic circuit 221*e*, the data A2 is stored in the sequential logic circuit 221*d*, the data A3 is stored in the sequential logic circuit 221*c*, the data A4 is stored in the sequential logic circuit 221*b*, and the data A5 is stored in the sequential logic circuit 221*a*.

The pixel data or the dummy data output from the line memory 2021 is input to the line memory 2022 (see $In_{2022}$).

At that time, the line memory 2022 stores the data input from the line memory 2021 for a certain period of time and outputs the data in response to a clock signal (CLK). For example, as shown in FIG. 4, in response to the clock signal, the data A1 input to the sequential logic circuit 222*a* after a time t2 is shifted to and stored in the sequential logic circuit 222*a*, the sequential logic circuit 222*b*, the sequential logic circuit 222*c*, the sequential logic circuit 222*d*, and the sequential logic circuit 222*e* for a certain period of time in this order. Then, the data A1 is output from the sequential logic circuit 222*e*.

Note that a period between the time t1 and the time t2 is an invalid period in which there is no movement of data.

Figure 5B:
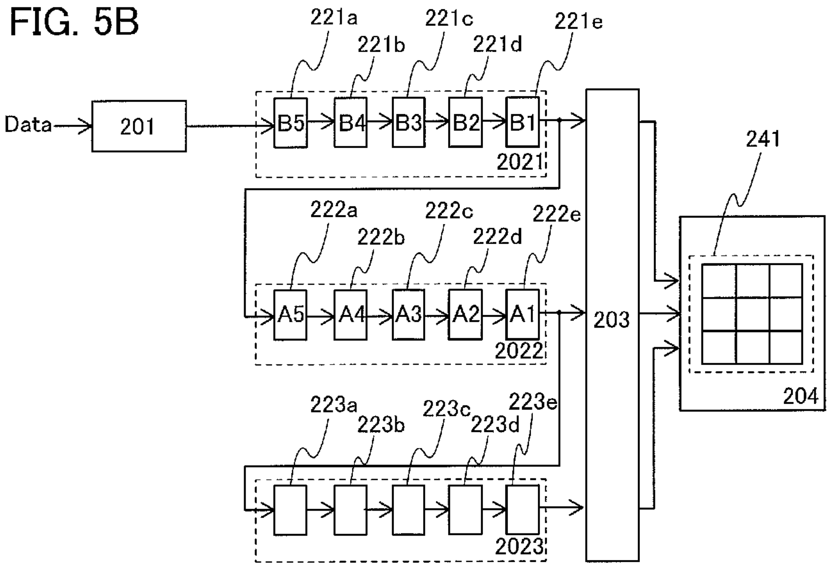

In addition, FIG. 5B shows the state of the image processing circuit in a time t3. As shown in FIG. 5B, in the time t3, the data A1 is stored in the sequential logic circuit 222*e*, the data A2 is stored in the sequential logic circuit 222*d*, the data A3 is stored in the sequential logic circuit 222*c*, the data A4 is stored in the sequential logic circuit 222*b*, and the data A5 is stored in the sequential logic circuit 222*a*. In addition, the data B1 is stored in the sequential logic circuit 221*e*, the data B2 is stored in the sequential logic circuit 221*d*, the data B3 is stored in the sequential logic circuit 221*c*, the data B4 is stored in the sequential logic circuit 221*b*, and the data B5 is stored in the sequential logic circuit 221*a*.

The data output from the line memory 2022 is input to the line memory 2023 (see $In_{2023}$).

At that time, the line memory 2023 stores the data input from the line memory 2022 for a certain period of time and outputs the data in response to a clock signal (CLK). For example, as shown in FIG. 4, in response to the clock signal, the data A1 input to the sequential logic circuit 222*a* after a time t4 is shifted to and stored in the sequential logic circuit 222*a*, the sequential logic circuit 222*b*, the sequential logic circuit 222*c*, the sequential logic circuit 222*d*, and the sequential logic circuit 222*e* for a certain period of time in this order. Then, the data A1 is output from the sequential logic circuit 222*e*.

Note that a period between the time t3 and the time t4 is an invalid period in which there is no movement of data.

In addition, FIG. 6C shows the state of the image processing circuit in a time t5. As shown in FIG. 6C, in the time t5, the data A1 is stored in the sequential logic circuit 223*e*, the data A2 is stored in the sequential logic circuit 223*d*, the data A3 is stored in the sequential logic circuit 223*c*, the data A4 is stored in the sequential logic circuit 223*b*, and the data A5 is stored in the sequential logic circuit 223*a*. In addition, the data B1 is stored in the sequential logic circuit 222*e*, the data B2 is stored in the sequential logic circuit 222*d*, the data B3 is stored in the sequential logic circuit 222*c*, the data B4 is stored in the sequential logic circuit 222*b*, and the data B5 is stored in the sequential logic circuit 222*a*. In addition, the data C1 is stored in the sequential logic circuit 221*e*, the data C2 is stored in the sequential logic circuit 221*d*, the data C3 is stored in the sequential logic circuit 221*c*, the data C4 is stored in the sequential logic circuit 221*b*, and the data C5 is stored in the sequential logic circuit 221*a*.

Next, the pixel data is sequentially input from each of the line memories 2021 to 2023 to the arithmetic circuit 204 in accordance with the output timing control circuit 203. At that time, a timing of sequentially inputting pixel data from each of the line memories 2021 to 2023 to the arithmetic circuit 204 comes up after the data A1 to the data A5 are stored in the line memory 2023, that is, a time t6 which comes after the time t5.

Note that a period between the time t5 and the time t6 is an invalid period in which there is no movement of data.

At that time, the arithmetic circuit 204 performs a filter process with the filter 241 with a 3×3 matrix by using the input pixel data. Through the filter process, one image processing data is generated.

Figure 6A:
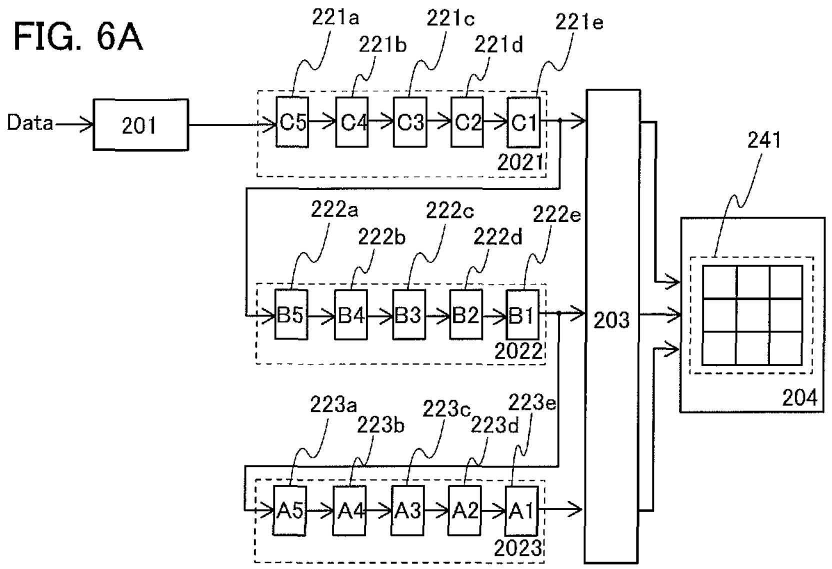
FIGS. 6A and 6B are block diagrams each illustrating operation of the image processing circuit shown in FIG. 2.
Figure 6B:
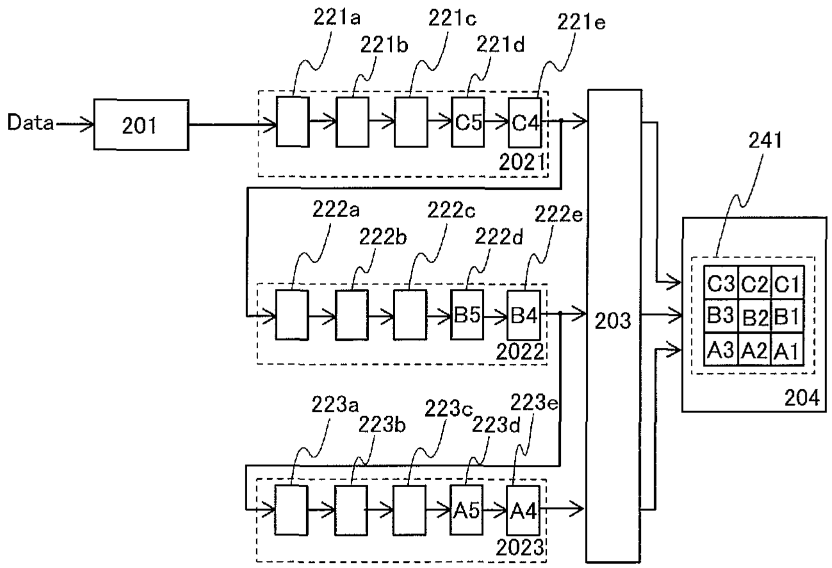

For example, FIG. 6B shows the state of the image processing circuit in a time t7. As shown in FIG. 6B, in the time t7, a filter process is performed with pixels corresponding to the data A1 to A3, the data B1 to B3, and data C1 to C3 used as pixels of interest. That is, one pixel data corresponding to the pixel of interest and eight pixel data corresponding to peripheral pixels of the pixel of interest are used. These pixel data correspond to pixels adjacent to each other in the row direction and the column direction. The image processing data generated by the filter process in the time t7 corresponds to data of a pixel corresponding to the data B1. This is the operation of the image processing circuit shown in FIG. 2.

As shown by the example in FIG. 2, one example of the image processing circuit in this embodiment includes the data adjustment circuit and the plurality of line memories electrically connected to each other. Further, in one line memory of one example of the image processing circuit in this embodiment, the number of sequential logic circuits is more than or equal to the number of pixel data corresponding to pixels in one row. Furthermore, in one example of the image processing circuit in this embodiment, the number of pixel data input is counted so that the number of columns of corresponding pixels is calculated, and, in the case where the number of columns of the pixels is smaller than the number of sequential logic circuits in one line memory, dummy data is output to the line memory in addition to the pixel data in accordance with the number of columns of the pixels. In this manner, combinations of pixel data output from the respective line memories to the arithmetic circuit at one timing can be the same regardless of the number of columns of the pixels without separately providing an address selection circuit or the like; therefore, the arithmetic circuit can perform the filter process by using pixel data corresponding to one pixel of interest and peripheral pixels thereof. Thus, the image processing circuit can be easily applied to a plurality of display devices with different specifications and the versatility of the image processing circuit can be improved. Further, since the image processing circuit in this embodiment has a structure in which an address selection circuit does not need to be separately provided, the number of wirings can be reduced.

Note that this embodiment can be combined with any of the other embodiments as appropriate.

Embodiment 3

In this embodiment, a method for manufacturing an image processing circuit according to one embodiment of the present invention is described.

The image processing circuit according to one embodiment of the present invention can be manufactured by using a p-type thin film transistor or an n-type thin film transistor, for example. As an example of the method for manufacturing the image processing circuit in this embodiment, a method for manufacturing the image processing circuit using a thin film transistor will be described with reference to FIGS. 7A to 7D, FIGS. 8A to 8C, and FIGS. 9A to 9C. FIGS. 7A to 7D, FIGS. 8A to 8C, and FIGS. 9A to 9C are cross-sectional views illustrating one example of the manufacturing method of the image processing circuit in this embodiment.

Figure 7A:
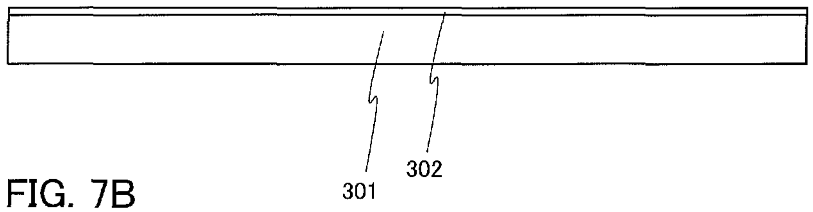
FIGS. 7A to 7D are cross-sectional views illustrating one example of a manufacturing method of an image processing circuit in Embodiment 3.

First, as illustrated in FIG. 7A, a base film 302 is formed over a substrate 301.

Note that when "B is formed on A" or "B is formed over A" is explicitly described in this specification, it does not necessarily mean that B is formed in direct contact with A. The description includes the case where A and B are not in direct contact with each other, i.e., the case where another object is interposed between A and B. Here, each of A and B corresponds to an object (e.g., a device, an element, a circuit, a wiring, an electrode, a terminal, a film, or a layer).

Accordingly, for example, when it is explicitly described that a layer B is formed on or over a layer A, it includes both the case where the layer B is formed in direct contact with the layer A, and the case where another layer (e.g., a layer C or a layer D) is formed in direct contact with the layer A and the layer B is formed in direct contact with the layer C or D. Note that another layer (e.g., a layer C or a layer D) may be construed as a single layer as well as a plurality of layers (e.g., a layer C and a layer D).

As the substrate 301, a glass substrate, a quartz substrate, or a flexible substrate can be used, for example. A flexible substrate is a substrate which can be bent (is flexible). For example, a plastic substrate and the like formed using polycarbonate, polyarylate, polyethersulfone, or the like can be given as examples of a flexible substrate. Alternatively, as the substrate 301, an attachment film (formed using polypropylene, polyester, vinyl, polyvinyl fluoride, polyvinyl chloride, or the like), paper formed of a fibrous material, a base material film (polyester, polyamide, an inorganic vapor deposition film, paper, or the like), or the like can be used.

The base film 302 can be formed using, for example, an oxide insulating film, a nitride insulating film, an oxide insulating film containing nitrogen, or the like. The oxide insulating film, the nitride insulating film, or the oxide insulating film containing nitrogen can be formed by a plasma CVD method or the like, for example. Alternatively, a stack of the above insulating films can be provided as the base film 302. Although the base film 302 is not necessarily provided, the provision of the base film 302 can prevent impurities such as alkali metal from diffusing from the substrate 301 to an upper layer, for example. When the base film 302 is provided, a silicon substrate, a metal substrate, a stainless steel substrate, or the like can also be used as the substrate 301.

Figure 7B:
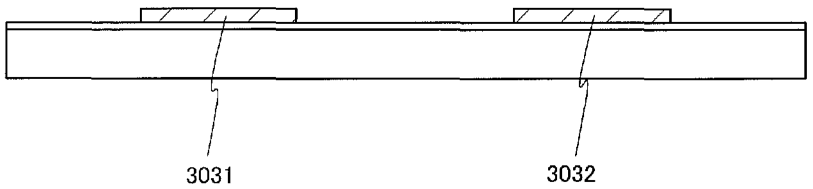

Next, a semiconductor layer is formed over the base film 302 and the semiconductor layer is selectively etched by using a resist or the like, so that a semiconductor layer 3031 and a semiconductor layer 3032 which are in an island shape are formed over the base film 302 as shown in FIG. 7B. The resist can be formed by a photolithography technique, for example.

As the semiconductor layer, for example, a semiconductor film such as an amorphous semiconductor film, a microcrystalline (also referred to as microcrystal) semiconductor film, or a polycrystalline semiconductor film can be used. The amorphous semiconductor film and the microcrystalline semiconductor film can be formed by a CVD method, for example. The polycrystalline semiconductor film can be formed by crystallizing an amorphous semiconductor film by thermal treatment, for example.

Alternatively, a single crystal semiconductor layer can be used as the semiconductor layer. The single crystal semiconductor layer can be formed by processing a single crystal semiconductor substrate, for example. As the single crystal semiconductor substrate, for example, a single crystal semiconductor substrate that is formed of an element which belongs to Group 14, such as a single crystal silicon substrate, a single crystal germanium substrate, or a single crystal silicon germanium substrate, can be used. Alternatively, a compound semiconductor substrate using gallium arsenide, indium phosphide, or the like can be used. In the case where the single crystal semiconductor layer is used, by attaching the substrate 301 and the single crystal semiconductor layer to each other with, for example, a bonding layer interposed therebetween, bonding surfaces thereof can be strongly bonded to each other. The bonding layer whose bonding surface is smooth and hydrophilic can be formed using silicon oxide containing hydrogen, silicon nitride containing hydrogen, silicon nitride containing oxygen and hydrogen, silicon oxynitride, silicon nitride oxide, or the like.

As silicon oxide containing hydrogen, for example, silicon oxide formed by a CVD method using organosilane is preferable. This is because the silicon oxide film formed of organosilane as the bonding layer can enhance bonding between the substrate 301 and the single crystal semiconductor layer. As organosilane, a silicon-containing compound such as tetraethoxysilane (TEOS) (chemical formula: $Si(OC_2H_5)_4$), tetramethylsilane (TMS) (chemical formula: $Si(CH_3)_4$), tetramethylcyclotetrasiloxane (TMCTS), octamethylcyclotetrasiloxane (OMCTS), hexamethyldisilazane (HMDS), triethoxysilane (chemical formula: $SiH(OC_2H_5)_3$), or tris(dimethylamino)silane (chemical formula: $SiH(N(CH_3)_2)_3$) can be used.

Note that in the case where the bonding layer is formed using silicon oxide, the bonding layer can be formed by a CVD method using monosilane, disilane, or trisilane as a source gas. The silicon oxide layer, which functions as a bonding layer, may be a thermal oxide film, and preferably contains chlorine.

Silicon nitride containing hydrogen can be formed by a plasma CVD method using a silane gas and an ammonia gas, for example. Further, hydrogen may be added to the gases. Silicon nitride containing oxygen and hydrogen can be manufactured by a plasma CVD method using a silane gas, an ammonia gas, and a nitrous oxide gas, for example. In either case, as the bonding layer, any of silicon oxide, silicon oxynitride, and silicon nitride oxide which are formed using a silane gas or the like as a source gas and contain hydrogen can be used.

Figure 7C:
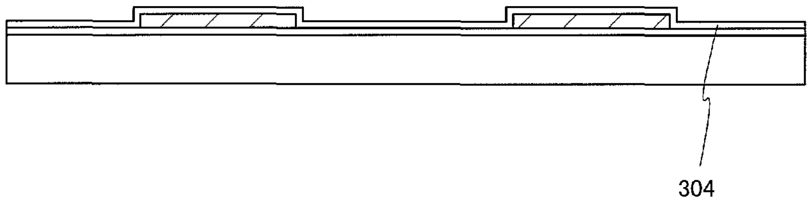

Next, as shown in FIG. 7C, a gate insulating layer 304 is formed over the semiconductor layer 3031 and the semiconductor layer 3032.

As the gate insulating layer 304, a silicon nitride film, a silicon oxide film, or a silicon oxide film containing nitrogen, for example, can be used. Further, the silicon nitride film, the silicon oxide film, or the silicon oxide film containing nitrogen can be formed by a plasma CVD, or the like.

Figure 7D:
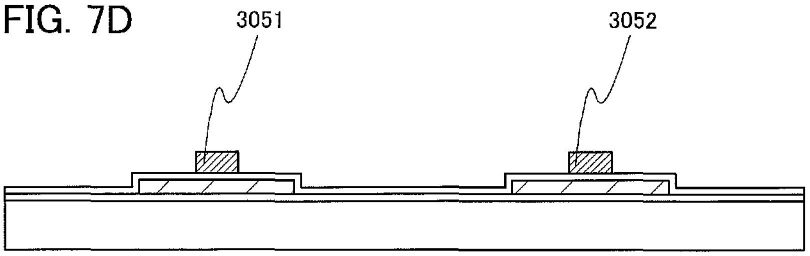

Next, as shown in FIG. 7D, a gate electrode 3051 is formed over part of the gate insulating layer 304, that is, part of the semiconductor layer 3031 with the gate insulating layer 304 interposed therebetween, and a gate electrode 3052 is formed over part of the semiconductor layer 3032 with the gate insulating layer 304 interposed therebetween.

For the gate electrode 3051 and the gate electrode 3052, an element selected from titanium, tungsten, tantalum, molybdenum, neodymium, cobalt, zirconium, zinc, ruthenium, rhodium, palladium, osmium, iridium, platinum, aluminum, gold, silver, or copper; an alloy material or a compound material containing the above element as its main component; or nitride of the above element can be used, for example. Alternatively, the gate electrode 3051 and the gate electrode 3052 can be formed by stacking the above materials. The layer formed using any of the above material can be formed by a sputtering method, for example.

Figure 8A:
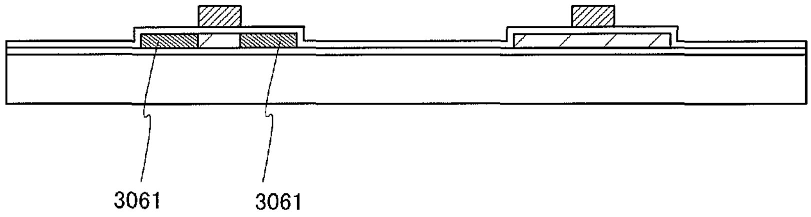
FIGS. 8A to 8C are cross-sectional views illustrating one example of the manufacturing method of the image processing circuit in Embodiment 3.

Next, as shown in FIG. 8A, n-type regions 3061 which form a pair of n-type regions are formed in part of the semiconductor layer 3031. For example, the n-type regions 3061 can be formed by forming a resist so as to cover at least the semiconductor layer 3032 and adding an impurity element imparting n-type conductivity to the part of the semiconductor layer 3031 with the use of the gate electrode 3051 and the resist as masks. As the impurity element imparting n-type conductivity, phosphorus can be used for example.

Figure 8B:
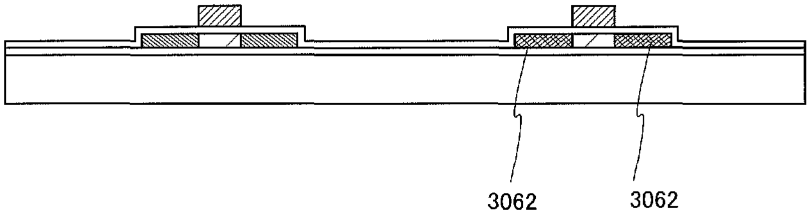

Next, as shown in FIG. 8B, p-type regions 3062 which form a pair of p-type regions are formed in part of the semiconductor layer 3032. For example, the p-type regions 3062 can be formed by forming a resist so as to cover at least the semiconductor layer 3031 and adding an impurity element imparting p-type conductivity to the part of the semiconductor layer 3032 with the use of the gate electrode 3052 and the resist as masks. As the impurity element imparting p-type conductivity, boron can be used for example.

Figure 8C:
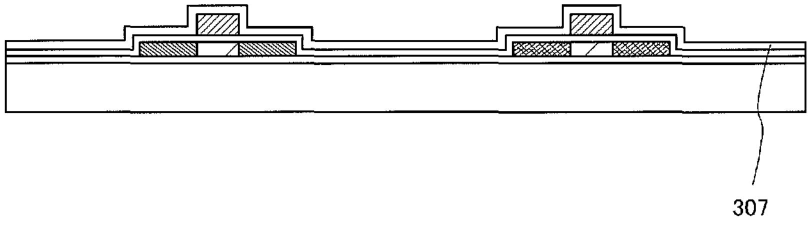

Next, as shown in FIG. 8C, a protection film 307 is formed over the gate insulating layer 304, the gate electrode 3051, and the gate electrode 3052. As the protection film 307, for example, an oxide insulating film, a nitride insulating film, nitride oxide insulating film, an oxynitride insulating film, or the like can be used. The insulating film listed above can be formed by a CVD method for example. The protection film 307 is not necessarily provided; however, the provision of the protection film 307 can protect the gate electrode 3051 and the gate electrode 3052 and can suppress adverse effect such as short circuit with a different wiring, for example.

Figure 9A:
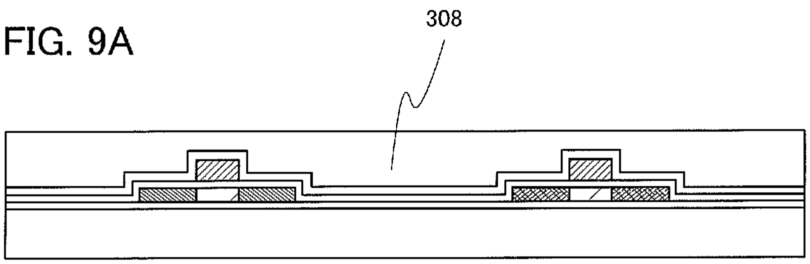
FIGS. 9A to 9C are cross-sectional views illustrating one example of the manufacturing method of the image processing circuit in Embodiment 3.

Next, as shown in FIG. 9A, an interlayer film 308 is formed over the protection film 307. The interlayer film 308 can be formed using an organic compound film and an inorganic compound film, for example. By the provision of the interlayer film 308, the flatness of a surface can be improved, for example.

Figure 9B:
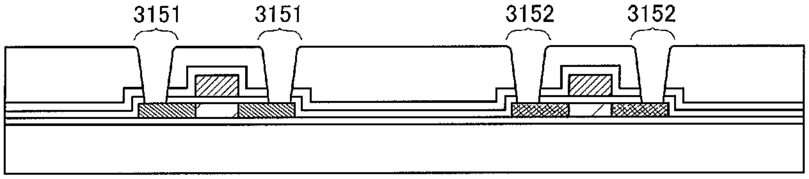

Next, as shown in FIG. 9B, opening portions 3151 which are a pair of opening portions and opening portions 3152 which are a pair of opening portions are formed in the protection film 307 and the interlayer film 308. Parts of the n-type regions 3061 are exposed by forming the opening portions 3151, and parts of the p-type region 3062 are exposed by forming the opening portions 3152. The opening portions 3151 and the opening portions 3152 can be formed by selectively forming a resist and performing etching by using the resist as a mask, for example.

Figure 9C:
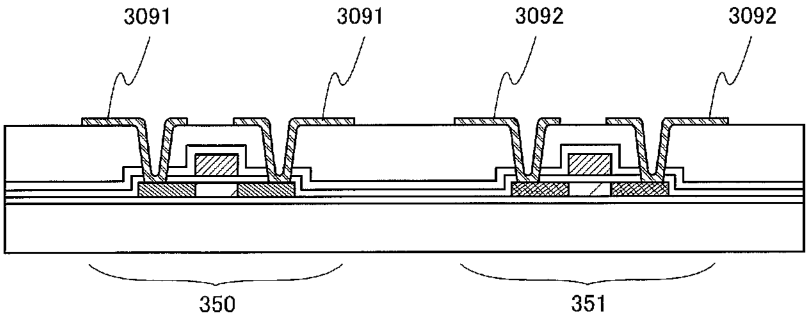

Next, as shown in FIG. 9C, electrodes 3091 are formed so as to be in contact with the n-type regions 3061 through the opening portions 3151, and electrodes 3092 are formed so as to be in contact with the p-type regions 3062 through the opening portions 3152. Each of the electrodes 3091 and the electrodes 3092 are a pair of electrodes. A material and a manufacturing method that can be applied to the gate electrodes 3051 and the gate electrodes 3052, for example, can be applied to the electrodes 3091 and the electrodes 3092 as appropriate.

In this manner, the image processing circuit according to one embodiment of the present invention can be formed using a transistor 350 and a transistor 351.

The transistor 350 is a staggered n-channel transistor and includes the semiconductor layer 3031, the gate insulating layer 304, the gate electrode 3051, the protection film 307, the interlayer film 308, and the electrodes 3091. At that time, the n-type region 3061 functions as one of source and drain regions and the electrode 3091 functions as one of source and drain wirings.

The transistor 351 is a staggered p-channel transistor and includes the semiconductor layer 3031, the gate insulating layer 304, the gate electrode 3051, the protection film 307, the interlayer film 308, and the electrodes 3092. At that time, the p-type region 3062 functions as one of source and drain regions and the electrode 3092 functions as one of source and drain wirings.

As described above, the image processing circuit according to one embodiment of the present invention can be formed using a thin film transistor. By forming the image processing circuit by using the thin film transistor, the image processing circuit can be formed to be thin.

Note that although FIGS. 7A to 7D, FIGS. 8A to 8C, and FIGS. 9A to 9C illustrate the method for forming the image processing circuit using the staggered transistor as the thin film transistor, this embodiment is not limited to this. An inverted staggered transistor can also be used. By using the inverted staggered transistor, the number of manufacturing steps of the transistor can be reduced.

Note that an oxide semiconductor layer can also be used as the semiconductor layer of the thin film transistor. As the oxide semiconductor layer, a semiconductor film of zinc oxide, $InGaO_3(ZnO)_m$ or the like can be used, for example. The oxide semiconductor layer can be formed by a sputtering method for example. By using the oxide semiconductor layer as the semiconductor layer of the thin film transistor, mobility can be increased and variations in elements can be reduced.

Note that this embodiment can be combined with any of other embodiments.

Embodiment 4

The image processing circuit according to one embodiment of the present invention can be applied to a variety of display devices such as liquid crystal display devices or electroluminescent display devices. In this embodiment, a display device including the image processing circuit according to one embodiment of the present invention is described.

Figure 10:
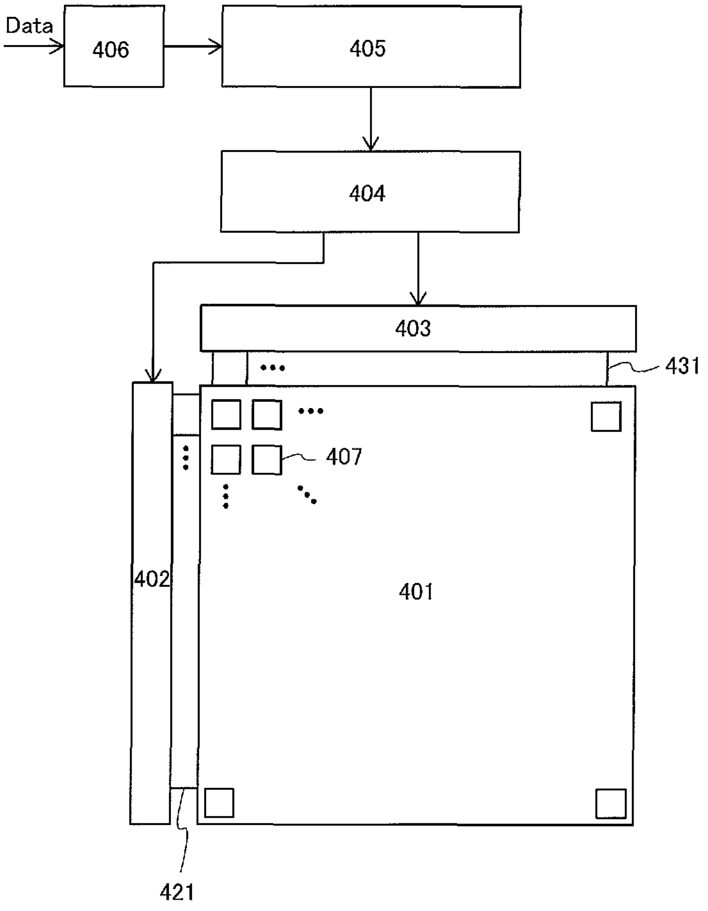
FIG. 10 is a block diagram illustrating an example of a structure of a display device in Embodiment 4.

An example of a structure of the display device in this embodiment is described with reference to FIG. 10. FIG. 10 is a block diagram illustrating the example of the structure of the display device in this embodiment.

The display device shown in FIG. 10 includes a pixel portion 401, a scan line driver circuit 402, a signal line driver circuit 403, a control circuit 404, an image processing circuit 405, and an AD (Analogic Digital) converter circuit 406.

The pixel portion 401 has a dot matrix structure in which a plurality of pixels 407 is arranged in the row direction and the column direction. Each of the pixels 407 is electrically connected to the scan line driver circuit 402 through a scan line 421 and to the signal line driver circuit 403 through a signal line 431. In addition, by forming the pixel 407 with a plurality of sub-pixels, for example, and making the sub-pixels display images of respective R (Red), G (Green), and B (Blue), full-color display can be performed.

The scan line driver circuit 402 selects the pixel 407 to which data is written and outputs a scan signal to the selected pixel through the scan line 421.

The signal line driver circuit 403, which outputs data to be written to the pixel 407 as a signal, outputs pixel data to the pixel 407 which is selected by the scan line driver circuit 402 through the signal line 431 as a data signal.

The control circuit 404 has a function of outputting a control signal which controls the scan line driver circuit 402 and the signal line driver circuit 403 in accordance with an input video signal.

The image processing circuit 405 performs image processing on the input data and outputs the data as image processing data. As the image processing circuit 405, any of the image processing circuits according to one embodiment of the present invention can be applied.

The AD converter circuit 406 has a function of converting an analog signal to a digital signal in the case where the input video signal is the analog signal. Accordingly, in the case where the input video signal is a digital signal, the AD converter circuit 406 is not necessarily provided.

Figure 11A:
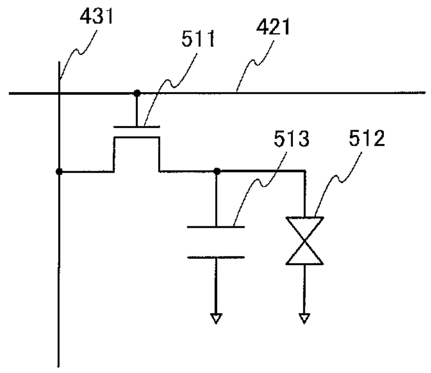
FIGS. 11A and 11B are circuit diagrams each illustrating a circuit configuration of a pixel in the display device shown in FIG. 10.
Figure 11B:
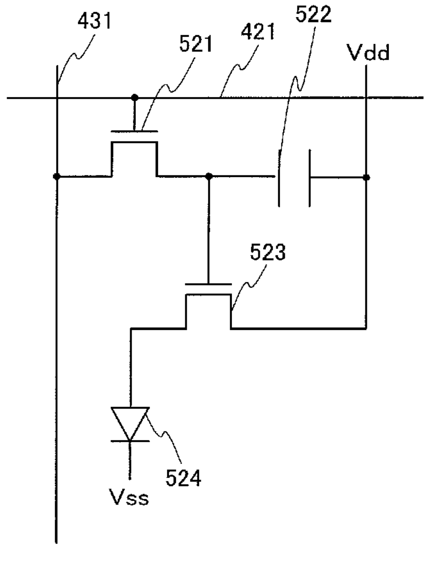

Next, an example of a circuit configuration of the pixel of the display device in FIG. 10 is described with reference to FIGS. 11A and 11B. FIGS. 11A and 11B are circuit diagrams illustrating the example of the circuit configuration of the pixel of the display device in FIG. 10. FIG. 11A shows the case of a liquid crystal display device and FIG. 11B shows the case of an EL display device.

A pixel shown in FIG. 11A includes a transistor 511, a liquid crystal element 512, and a capacitor 513.

The transistor 511 includes at least three terminals of a gate, a source, and a drain.

The gate refers to part of a gate electrode and a gate wiring or to the entire gate electrode and gate wiring. The gate wiring refers to a wiring for electrically connecting a gate electrode of at least one transistor to another electrode or another wiring. For example, a scan line of a display device is included in a gate wiring.

The source refers to part of a source region, a source electrode, and a source wiring or to the entire source region, source electrode, and source wiring. The source region refers to a region with resistivity which is lower than or equal to a certain value in a semiconductor layer. The source electrode refers to part of a conductive layer which is connected to the source region. The source wiring refers to a wiring for electrically connecting a source electrode of at least one transistor to another electrode or another wiring. For example, in the case where a signal line of the display device is electrically connected to the source electrode, the source wiring includes the signal line.

The drain refers to part of a drain region, a drain electrode, and a drain wiring or to the entire drain region, drain electrode, and drain wiring. The drain region refers to a region with resistivity which is lower than or equal to a certain value in a semiconductor layer. The drain electrode refers to part of a conductive layer which is connected to the drain region. The drain wiring refers to a wiring for electrically connecting a drain electrode of at least one transistor to another electrode or another wiring. For example, in the case where a signal line of the display device is electrically connected to the drain electrode, the drain wiring includes the signal line.

Since the source and the drain of the transistor in this specification are changed depending on the structure, the operating conditions, or the like of the transistor, it is difficult to define which is a source and which is a drain. Therefore, in this document (the specification, the scope of claims, the drawings, and the like), one terminal which is selected at will from a source terminal and a drain terminal is called one of the source and the drain, while the other terminal is called the other of the source and the drain.

The transistor 511 functions as a selection switch. A gate of the transistor 511 is electrically connected to the scan line 421 shown in FIG. 10. One of a source and a drain of the transistor 511 is electrically connected to the signal line 431 shown in FIG. 10.

The liquid crystal element 512 includes a first terminal and a second terminal. The first terminal of the liquid crystal element 512 is electrically connected to the other of the source and the drain of the transistor 511. Ground potential or potential of a certain value (also referred to as common potential) is applied to the second terminal of the liquid crystal element 512. The liquid crystal element 512 can include a first electrode which is part of the first terminal or the entire first terminal, a second electrode which is part of the second terminal or the entire second terminal, and a layer including liquid crystal molecules whose transmittance is changed by application of voltage between the first electrode and the second electrode (the layer is also referred to as a liquid crystal layer), for example.

The capacitor 513 functions as a storage capacitor and includes a first terminal and a second terminal. In addition, the first terminal of the capacitor 513 is electrically connected to the other of the source and the drain of the transistor 511. Ground potential or potential of a certain value is applied to the second terminal of the capacitor 513. The capacitor 513 includes a first electrode which is part of the first terminal or the entire first terminal, a second electrode which is part of the second terminal or the entire second terminal, and a dielectric layer. Note that although the capacitor 513 is not necessarily provided, the provision of the capacitor 513 can suppress adverse effect due to leakage current from the transistor 511.

Next, operation of the pixel shown in FIG. 11A is described.

First, a pixel to which data is written is selected. Then, the transistor 511 in the selected pixel is turned on by a signal input from the scan line 421.

At that time, a data signal from the signal line 431 is input through the transistor 511 and the potential of the first terminal of the liquid crystal element 512 becomes equal to the potential of the data signal, whereby the transmittance of the liquid crystal element 512 is set in accordance with voltage applied between the first terminal and the second terminal of the liquid crystal element 512. After writing the data, the transistor 511 is turned off by a signal input from the scan line 421, the liquid crystal element 512 maintains the transmittance set during a display period, thereby goes into a display state. The above operation is sequentially performed with respect to each scan line 421 so that data is written to all the pixels.

The pixel shown in FIG. 11B includes a transistor 521, a capacitor 522, a transistor 523, and a light-emitting element 524.

A gate of the transistor 521 is electrically connected to the scan line 421 shown in FIG. 10. One of a source and a drain of the transistor 521 is electrically connected to the signal line 431 shown in FIG. 10.

The capacitor 522 functions as a storage capacitor and includes a first terminal and a second terminal. The first terminal of the capacitor 522 is electrically connected to the other of the source and the drain of the transistor 521. High power supply potential (also referred to as Vdd) is applied to the second terminal of the capacitor 522. The high power supply potential can be generated by a power supply circuit or the like. Note that although the capacitor 522 is not necessarily provided, the provision of the capacitor 522 can maintain a light-emission state even after writing.

A gate of the transistor 523 is electrically connected to the other of the source and the drain of the transistor 521. The high power supply potential is applied to one of the source and the drain of the transistor 523.

The light-emitting element 524 includes a first terminal and a second terminal. The first terminal of the light-emitting element 524 is electrically connected to the other of the source and the drain of the transistor 523. Low power supply potential (also referred to as Vss) is applied to the second terminal of the light-emitting element 524. The light-emitting element 524 can include a first electrode which is part of the first terminal or the entire first terminal, a second electrode which is part of the second terminal or the entire second terminal, and an electroluminescence layer which emits light by application of voltage between the first electrode and the second electrode. As the light-emitting element 524, an EL (also referred to as electroluminescent) element can be used. As the EL element, organic EL or inorganic EL can be used for example.

Note that the high power supply potential has a value relatively larger than that of the low power supply potential. The low power supply potential has a value relatively smaller than that of the high power supply potential. There is no particular limitation on each value because each value is set in accordance with the specifications of a circuit, or the like as appropriate. For example, although Vdd is higher than Vss, the case where $|Vdd|>|Vss|$ is not always satisfied. In addition, although Vdd is higher than Vss, the case where $VGND \geq Vss$ is not always satisfied.

At least one of the first electrode and the second electrode of the light-emitting element 524 may be formed using a conductive material having a light-transmitting property. Accordingly, light-emitting elements having a top emission structure in which light is emitted through the surface opposite to the substrate, having a bottom emission structure in which light is emitted through the surface on the substrate side, and having a dual emission structure in which light is emitted through the surface opposite to the substrate and the surface on the substrate side can be obtained. As the conductive material having a light-transmitting property, a light-transmitting conductive film such as a film of indium oxide including tungsten oxide, indium zinc oxide including tungsten oxide, indium oxide including titanium oxide, indium tin oxide including titanium oxide, indium tin oxide (hereinafter referred to as ITO), indium zinc oxide, or indium tin oxide to which silicon oxide is added can be used.

The electroluminescent layer may be formed using a single layer or a plurality of layers stacked. When the electroluminescent layer is formed using a plurality of layers, an electron-injection layer, an electron-transporting layer, an electroluminescent layer, a hole-transporting layer, and a hole-injecting layer are stacked in this order over the first electrode. Note that it is not necessary to form all of these layers. The electroluminescent layer can be formed using an organic compound or an inorganic compound.

Next, operation of the pixel shown in FIG. 11B is described.

First, a pixel to which data is written is selected. In the selected pixel, the transistor 521 is turned on by a scan signal input from the scan line 421 and a data signal with potential of a predetermined value is input from the signal line 431 to the gate of the transistor 523.

The transistor 523 is turned on or off depending on the potential of the data signal input to the gate. When the transistor 523 is on, the potential of the light-emitting element 524 has a value which depends on the gate potential of the transistor 523 and on the potential Vdd. At that time, current flows in response to voltage applied between the first terminal and the second terminal of the light-emitting element 524 and the light-emitting element 524 emits light with luminance corresponding to the amount of the flowing current. In addition, since the gate potential of the transistor 523 is stored in the capacitor 522 for a certain period of time, the light-emitting element 524 maintains a light-emission state for a certain period of time. This is the operation of the pixel shown in FIG. 11B.

In addition, in the case where the data signal input from the signal line 431 to the pixel is a digital signal, the pixel goes into a light-emission state or a non-light-emission state when the transistor is turned on and off. Thus, grayscale can be displayed using an area ratio grayscale method or a time ratio grayscale method. An area ratio grayscale method refers to a driving method by which one pixel is divided into a plurality of sub-pixels and the respective sub-pixels with the circuit configuration shown in FIG. 11B are driven separately based on data signals so that grayscale is displayed. Further, a time ratio grayscale method refers to a driving method by which a period during which a pixel is in a light-emitting state is controlled so that grayscale is displayed.

Since the light-emitting element 524 has a higher response speed than the liquid crystal element 512 shown in FIG. 11A for example, the time ratio grayscale method is preferable for the light-emitting element 524. Specifically, in the case of performing display with the time ratio grayscale method, one frame period is divided into a plurality of subframe periods. Then, in accordance with video signals, the light-emitting element in the pixel is set in a light-emitting state or a non-light-emitting state in each subframe period. By dividing one frame period into a plurality of subframe periods, the total length of time, in which a pixel actually emits light in one frame period, can be controlled by video signals so that grayscale can be displayed.

Figure 12A:
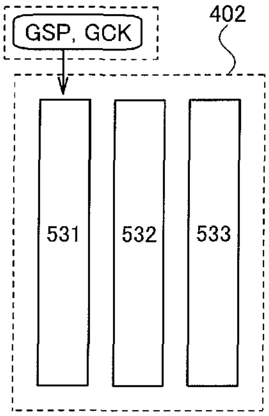
FIGS. 12A and 12B are block diagrams each illustrating a circuit configuration of a driver circuit in the display device shown in FIG. 10.
Figure 12B:
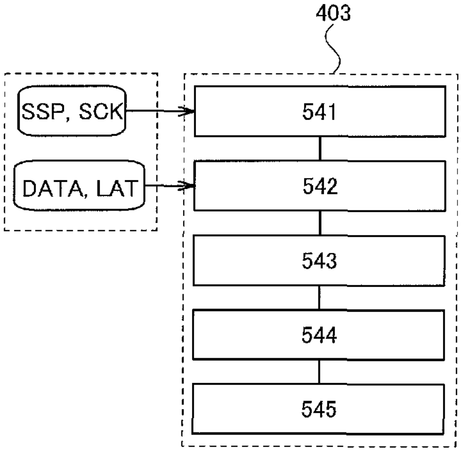

Next, an example of a structure of a driver circuit in the display device shown in FIG. 10 is described with reference to FIGS. 12A and 12B. FIGS. 12A and 12B are block diagrams illustrating the example of the structure of the driver circuit in the display device shown in FIG. 10. FIG. 12A illustrates the scan line driver circuit and the FIG. 12B illustrates the signal line driver circuit.

The scan line driver circuit 402 in FIG. 12A includes a shift register 531, a level shifter 532, and a buffer 533.

A signal such as a gate start pulse (GSP) or a gate clock signal (GCK) is input to the shift register 531.

The level shifter 532 has a function of generating signals divided in accordance with a use based on an input signal.

The buffer 533 has a function for amplifying a signal and includes an operational amplifier or the like.

The signal line driver circuit 403 shown in FIG. 12B includes a shift register 541, a latch circuit 542, a level shifter 543, a buffer 544, and a DA converter circuit 545.

A signal such as start pulse (SSP) or the like is input into the shift register 541.

A data signal on which a filter process is performed is input to the latch circuit 542 from the image processing circuit 405. Stored latch signals are output to the pixel portion in FIGS. 5A and 5B all at once. Such driving is referred to as line sequential driving.

The level shifter 543 has a function of generating signals divided in accordance with a use based on an input signal.

The buffer 544 has a function of amplifying a signal and includes an operational amplifier or the like.

The DA converter circuit 545 has a function of converting a digital signal into an analog signal in the case where an input signal is a digital signal. Note that in the case where the input signal is an analog signal, the DA converter circuit 545 is not necessarily provided.

The control circuit 404 has a function of generating a control signal based on the data signal input from the image processing circuit 405 and outputting the control signal to the scan line driver circuit 402 and the signal line driver circuit 403.

The image processing circuit 405 has a function of generating the data signal on which image processing is performed by a filter process on the input data signal (also referred to as a video signal). As the image processing circuit 405, the image processing circuit according to one embodiment of the present invention can be applied. The description of the image processing circuit in the above embodiments is employed as appropriate for the specific description.

Next, operation of the display device in FIG. 10 is described.

First, a first data signal is converted into a digital signal by the AD converter circuit 406.

The converted first data signal is input to the image processing circuit 405.

The image processing circuit 405 performs image processing on the first data signal and outputs the data signal on which the image processing is performed to the control circuit 404 as a second data signal.

The control circuit 404 generates a control signal based on the input second data signal and outputs the control signal to the scan line driver circuit 402 and the signal line driver circuit 403.

The scan line driver circuit 402 selects the scan line 421 to which data is written in accordance with the control signal. The data signal is input to the pixel 407 electrically connected to the selected scan line 421 from the signal line driver circuit 403 through the signal line 431, whereby the pixel 407 goes into a display state. Further, the scan line driver circuit 402 sequentially selects the scan lines 421 and data is written to all the pixels 407. This is the operation of the display device shown in FIG. 10.

As shown in the example of the display device in FIG. 10, by applying the image processing circuit according to one embodiment of the present invention to the display device, image processing can be performed on the pixel data in each frame, whereby clearer display of still images or moving images can be performed.

In addition, although the dummy data is output in accordance with the number of columns of pixel data in the image processing circuit according to one embodiment of the present invention, the dummy data is not displayed on the pixel portion in the display device of this embodiment; therefore, desired display can be performed regardless of the number of pieces of pixel data.

Note that this embodiment can be combined with any of the other embodiments as appropriate.

Embodiment 5

In this embodiment, as an example of the display device in Embodiment 4, a liquid crystal display device is described.

Figure 13:
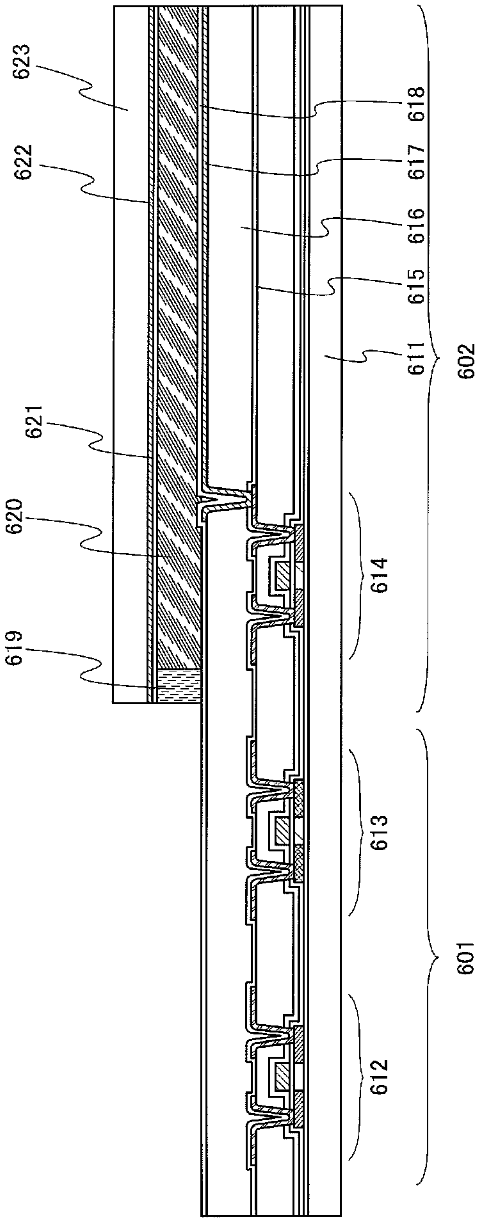
FIG. 13 is a cross-sectional view illustrating an example of a structure of a liquid crystal display device in Embodiment 5.

An example of a structure of the liquid crystal display device in this embodiment is described with reference to FIG. 13. FIG. 13 is a cross-sectional view illustrating the example of the structure of the liquid crystal display device in this embodiment.

The liquid crystal display device shown in FIG. 13 includes a substrate 611, a transistor 612, a transistor 613, a transistor 614, a protection film 615, an interlayer film 616, an electrode 617, a protection film 618, a sealing material 619, a liquid crystal layer 620, a protection film 621, an electrode 622, and a substrate 623.

For the substrate 611, a material that can be applied to the substrate 301 shown in FIGS. 7A to 7D can be used as appropriate.

The transistor 612 and the transistor 613 can be provided in a peripheral circuit portion 601. Each of the transistor 612 and the transistor 613 is a p-channel transistor or an n-channel transistor and is formed over the substrate 611. As the peripheral circuit including the transistor 612 and the transistor 613, for example, a scan line driver circuit, a signal line driver circuit, a control circuit, the image processing circuit according to one embodiment of the present invention, or the like can be given. The above-described peripheral circuits can be provided over one substrate as shown in FIG. 13.

The transistor 614 is provided in a display portion 602. The transistor 614 is a p-channel transistor or an n-channel transistor and is formed over the substrate 611.

The transistors 612 to 614 can be formed by the manufacturing method of the image processing circuit shown in FIGS. 7A to 7D, FIGS. 8A to 8C, and FIGS. 9A to 9C, for example. Further, the transistors 612 to 614 can be formed over one substrate as shown in FIG. 13.

The protection film 615 is provided so as to cover the transistors 612 to 614 and prevents entry of contamination impurities such as organic substances, metal substances, or water vapor floating in air. As the protection film 615, a dense film is preferable; for example, a silicon oxide film, a silicon nitride film, a silicon oxynitride film, a silicon nitride oxide film, an aluminum oxide film, an aluminum nitride film, an aluminum oxynitride film, or an aluminum nitride oxide film can be used. Note that the films listed above can be formed by a sputtering method, for example. Alternatively, the protection film 615 can be formed by stacking a plurality of the films listed above.

The interlayer film 616 mainly fulfills flattening purposes and is provided over the protection film 615. As the interlayer film 616, a film containing an organic material having heat resistance, such as polyimide, acrylic, benzocyclobutene, polyamide, or epoxy, can be used. Other than such organic materials, for example, it is also possible to use a film containing a low-dielectric constant material (a low-k material), a siloxane-based resin, PSG (phosphosilicate glass), BPSG (borophosphosilicate glass), or the like. In addition, the interlayer film 616 can be formed by stacking a plurality of the materials listed above.

Note that a siloxane resin corresponds to a resin including a Si—O—Si bond formed using a siloxane-based material as a starting material. The siloxane-based resin may include, as a substituent, an organic group (e.g., an alkyl group, and an aryl group) or a fluoro group. The organic group may include a fluoro group.

Further, there is no particular limitations on a method for forming the interlayer film 616, and the following method can be employed depending on the material as appropriate: a sputtering method, an SOG (spin on glass) method, a spin coating method, a dipping method, a spray coating method, a droplet discharge method (e.g., an ink-jet method, screen printing, offset printing, or the like), a doctor knife, a roll coater, a curtain coater, a knife coater, or the like. In the case where the interlayer film 616 is formed using a material solution, a semiconductor layer may be annealed (at 300 to 400° C.) at the same time as a baking step. The baking step of the interlayer film 616 serves also as an annealing step of the semiconductor layer, thereby a display device can be manufactured efficiently.

The electrode 617 is electrically connected to a source electrode or drain electrode of the transistor 614 through an opening portion provided in the protection film 615 and the interlayer film 616. As the electrode 617, a conductive film containing a light-transmitting conductive material such as indium oxide containing tungsten oxide, indium zinc oxide containing tungsten oxide, indium oxide containing titanium oxide, indium tin oxide containing titanium oxide, indium tin oxide (hereinafter referred to as ITO), indium zinc oxide, or indium tin oxide to which silicon oxide is added can be used. Alternatively, the electrode 617 can be formed using a conductive composition containing a conductive high molecule (also referred to as a conductive polymer). The pixel electrode formed using the conductive composition preferably has a sheet resistance less than or equal to 10000 Ω/square and a light transmittance greater than or equal to 70% at a wavelength of 550 nm. Moreover, the conductive high molecule in the conductive composition preferably has a resistivity of 0.1 Ω·cm or less.

As the conductive high molecule, a so-called π electron conjugated conductive high molecule can be used. Examples thereof include polyaniline and its derivatives, polypyrrole and its derivatives, polythiophene and its derivatives, and copolymers of two or more kinds of them.

The protection film 618 is provided so as to cover the electrode 617.

As the substrate 623, a substrate that can be applied to the substrate 611, for example, can be used as appropriate.

The electrode 622 is provided on the substrate 623 side. For the electrode 622, a material that can be applied to the electrode 617, for example, can be used.

The protection film 621 is provided so as to cover the electrode 622.

The liquid crystal layer 620 is sealed between the substrate 611 and the substrate 623 with the sealing material 619.

As shown in the example in FIG. 13, the liquid crystal display device in this embodiment has a structure in which the display portion and the peripheral circuit portion are provided over one substrate and the image processing circuit according to one embodiment of the present invention is provided in the peripheral circuit portion. Since the display portion and the peripheral circuit portion are provided over one substrate, the number of wirings between the display portion and the peripheral circuit portion can be reduced.

Note that the liquid crystal display device in this embodiment can have a structure in which an alignment film and a polarizing plate are included and a color filter or a light-shielding film is further included.

In addition, although the liquid crystal display device shown in FIG. 13 is a transmissive liquid crystal display device as an example, this embodiment is not limited to this. The liquid crystal display device according to this embodiment can be applied to a reflective liquid crystal display device or a transflective liquid crystal display device.

In addition, although the liquid crystal display device shown in FIG. 13 has a structure in which a polarizing plate is provided on the exterior side of the substrate (a viewing side) and a coloring layer and an electrode used for a display element are provided in this order on the interior side of the substrate, for example. However, this embodiment is not limited to this. The liquid crystal display device in this embodiment can have a structure in which the polarizing plate is provided on the interior side of the substrate. Further, a layered structure of the polarizing plate and the coloring layer is not limited to that shown in FIG. 13. The layered structure of the polarizing plate and the coloring layer in the display device of this embodiment may be set in accordance with materials or the condition of a manufacturing process of the polarizing plate and the coloring layer as appropriate. Furthermore, the display device of this embodiment can be provided with a light-shielding film which functions as a black matrix.

Note that this embodiment can be combined with any of the other embodiments as appropriate.

Embodiment 6

In this embodiment, a light-emitting display device is described as an example of the display device described in Embodiment 4.

Figure 14:
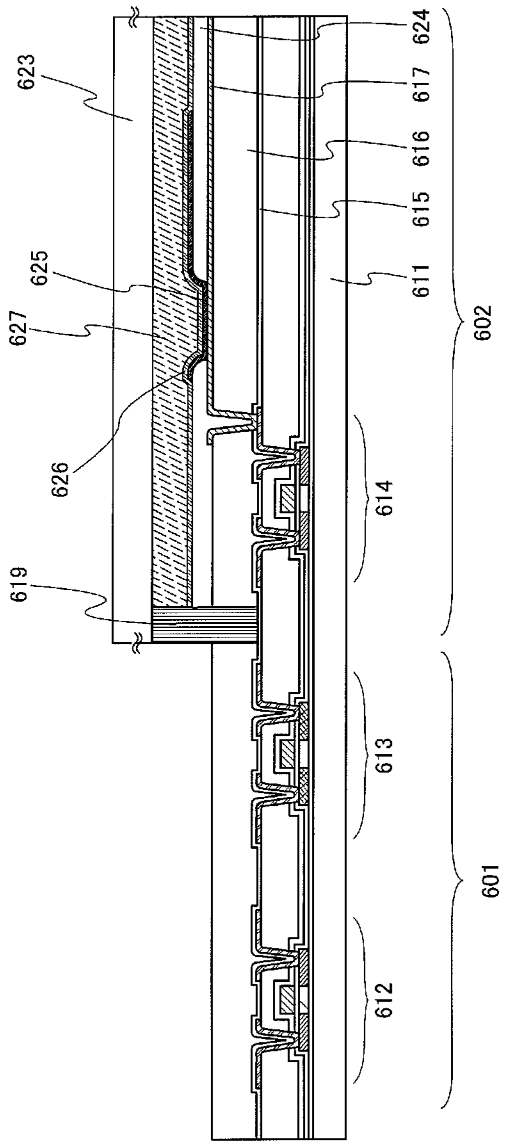
FIG. 14 is a cross-sectional view illustrating an example of a structure of a light-emitting display device in Embodiment 6.

An example of a structure of the light-emitting display device in this embodiment is described with reference to FIG. 14. FIG. 14 is a cross-sectional view illustrating the example of the structure of the light-emitting display device in this embodiment.

The light-emitting display device shown in FIG. 14 is a display device including an electroluminescent (also referred to as EL) element as a light-emitting element. EL elements are classified depending on whether a light-emitting material is an organic compound or an inorganic compound; and generally, the former is called an organic EL element and the latter is called an inorganic EL element.

In the case of an organic EL element, voltage is applied to the light-emitting element, so that electrons are injected from an electrode into a layer including a light-emitting organic compound, and holes are injected from the other electrode into the layer including the light-emitting organic compound, and there flows electric current. Then, by recombination of these carriers (electrons and holes), the organic compound having a light-emitting property gets in an excited state, and light is emitted when the excited state returns to a ground state. From such a mechanism, such a light emitting element is referred to as a current excitation type light-emitting element.

Inorganic EL elements are classified in a dispersive inorganic EL element and a thin-film inorganic EL element. The dispersive inorganic EL element includes a light-emitting layer in which particles of a light-emitting material are dispersed in a binder, and light emission mechanism thereof is donor-acceptor recombination light emission, in which a donor level and an acceptor level are utilized. In a thin film inorganic EL element, a light-emitting layer is sandwiched between dielectric layers, and the dielectric layers are sandwiched between electrodes. Light emission mechanism of the thin film inorganic EL element is local light emission, in which inner-shell electron transition of a metal ion is utilized. Note that description is made here using the organic EL element as the light-emitting element.

The light-emitting display device shown in FIG. 14 includes the substrate 611, the transistor 612, the transistor 613, the transistor 614, the protection film 615, the interlayer film 616, the electrode 617, the sealing material 619, a partition wall 624, an electroluminescent layer 625, an electrode 626, a filler 627, and a substrate 623. Note that in the light-emitting display device in FIG. 14, for the description of the same portion as the liquid crystal display device in FIG. 13, the description of that in the liquid crystal display device in FIG. 13 is employed as appropriate.

The substrate 611 or the substrate 623 needs to have a light-transmitting property in the case where the substrate 611 or the substrate 623 is in the direction in which light from the light-emitting element is extracted. As a substrate having a light-transmitting property, for example, a glass substrate, a plastic substrate, a polyester film, an acrylic film, or the like can be used.

The partition wall 624 is provided over the electrode 617. For the partition wall 624, an organic resin film, an inorganic resin film, or an organic polysiloxane, for example, can be used. It is particularly preferable that the partition 624 be formed using a photosensitive material to have an opening portion over the electrode layer 617 so that a sidewall of the opening portion is formed as a tilted surface with continuous curvature.

The electroluminescent layer 625 is provided so as to be electrically connected to the electrode 617 through the opening portion provided in the partition wall 624. In addition, the electroluminescent layer 625 can be formed using a single layer or a stack of a plurality of layers.

The electrode 626 is provided over the electroluminescence layer 625. For the electrode 626, a material that can be applied to the electrode 622 shown in FIG. 13 can be used as appropriate.

The light-emitting element includes the electrode 617, the electroluminescence layer 625, and the electrode 626.

Note that at least one of the electrode 617 and the electrode 626 may have a light-transmitting property in order to extract light. By using the electrode with a light-transmitting property, a top emission structure in which light is emitted through the surface opposite to the substrate, a bottom emission structure in which light is emitted through the surface on the substrate side, and a dual emission structure in which light is emitted through the surface opposite to the substrate and the surface on the substrate side can be obtained.

Note that in the light-emitting display device in this embodiment, a protection film can be formed over the electrode 626 and the partition wall 624. By providing the protection film, entry of oxygen, hydrogen, moisture, carbon dioxide, or the like into the light-emitting element can be prevented. As the protection film, for example, a silicon nitride film, silicon nitride oxide film, a DLC (diamond-like carbon) film, or the like can be used.

The filler 627 is provided so as to cover the electrode 626. The light-emitting element is sealed between the substrate 611 and the substrate 623 with the sealing material 619 and the filler 627. As the filler 627, an inert gas such as nitrogen or argon can be used. In addition, a resin such as PVC (polyvinyl chloride), acrylic, polyimide, an epoxy resin, a silicone resin, PVB (polyvinyl butyral), or EVA (ethylene vinyl acetate), other ultra violet curable resins, or a thermosetting resin can be used.

As shown in the example in FIG. 14, the light-emitting display device in this embodiment has a structure in which the display portion and the peripheral circuit portion are provided over one substrate and the image processing circuit according to one embodiment of the present invention is provided in the peripheral circuit portion. Since the display portion and the peripheral circuit portion are provided over one substrate, the number of wirings between the display portion and the peripheral circuit portion can be reduced.

Note that in the light-emitting display device in this embodiment, optical films such as a polarizing plate or a circular polarizing plate (including an elliptical polarizing plate), a retardation plate (a $\lambda/4$ plate, a $\lambda/2$ plate), and a color filter can be provided on an emission surface of the light-emitting element. Further, the polarizing plate or the circular polarizing plate can be provided with an anti-reflective film. By providing only the polarizing plate or polarizing plate and the anti-reflective film, anti-glare treatment may be carried out by which reflected light can be scattered by roughness of a surface so as to reduce reflection.

In addition, although the organic EL element is described as the light-emitting element in the light-emitting display device in FIG. 14, this embodiment is not limited to this. The light-emitting display device in this embodiment can be provided with an inorganic EL element as the light-emitting element.

Note that this embodiment can be combined with any of the other embodiments as appropriate.

Embodiment 7

The display device provided with the image processing circuit according to one embodiment of the present invention can be used for display portions of a variety of electronic devices. In this embodiment, electronic devices in each of which a display device provided with the image processing circuit according to one embodiment of the present invention is mounted on a display portion are described.

Structures of electronic devices in this embodiment are described with reference to FIGS. 15A to 15H. FIGS. 15A to 15H each illustrate an example of the structure of the electronic device of this embodiment.

Figure 15A:
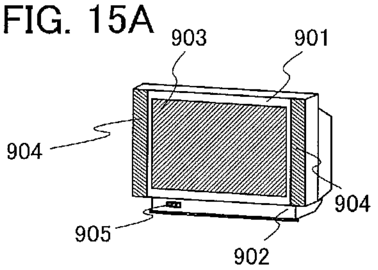
FIGS. 15A to 15H are diagrams each illustrating an example of a structure of an electronic device in Embodiment 7.

FIG. 15A illustrates a structure of a display device. The display device in FIG. 15A includes a housing 901, a supporting base 902, a display portion 903, speaker portions 904, a video input terminal 905, and the like. The above-described display device can be applied to the display portion 903. Note that the category of the display device includes all the display devices for personal computers, TV broadcast reception, advertisement display, and the like.

Figure 15B:
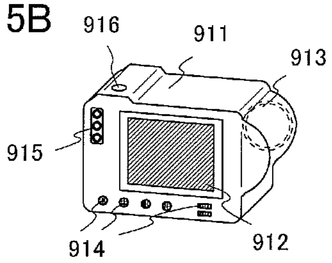

FIG. 15B illustrates a structure of a digital still camera. The digital still camera in FIG. 15B includes a main body 911, a display portion 912, an image receiving portion 913, operation keys 914, an external connection port 915, a shutter button 916, and the like. The above-described display device can be applied to the display portion 912.

Figure 15C:
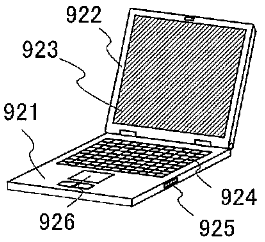

FIG. 15C illustrates a structure of a notebook personal computer. The notebook personal computer in FIG. 15C includes a main body 921, a housing 922, a display portion 923, a keyboard 924, an external connection port 925, a pointing device 926, and the like. A display device of the present invention can be applied to the display portion 923.

Figure 15D:
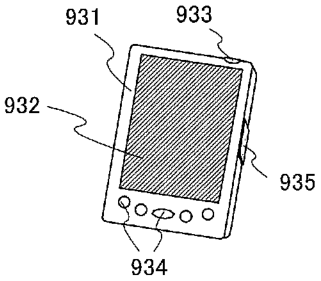

FIG. 15D illustrates a structure of a mobile computer. The mobile computer in FIG. 15D includes a main body 931, a display portion 932, a switch 933, operation keys 934, an infrared port 935, and the like. A display device of the present invention can be applied to the display portion 932.

Figure 15E:
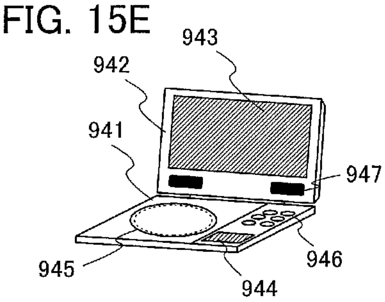

FIG. 15E illustrates a structure of a portable image reproducing device provided with a recording medium (specifically, a DVD playback device). The portable image reproducing device in FIG. 15E includes a main body 941, a housing 942, a display portion A 943, a display portion B 944, a recording medium (such as a DVD) reading portion 945, operation keys 946, speaker portions 947, and the like. The display portion A 943 mainly displays image data, while the display portion B 944 mainly displays text data. The above-described display device can be used for the display portion A 943 and the display portion B 944. Further, the image-reproducing device equipped with a recording medium includes a home video game machine and the like.

Figure 15F:
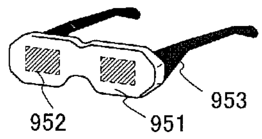

FIG. 15F illustrates a structure of a goggle display (head mounted display). The goggle display in FIG. 15F includes a main body 951, a display portion 952, and an arm portion 953. A display device of the present invention can be applied to the display portion 952.

Figure 15G:
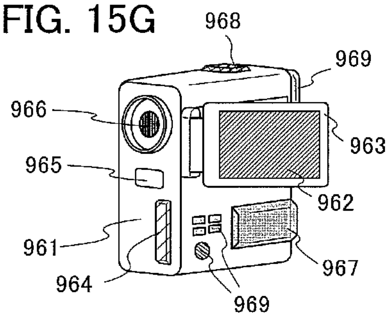

FIG. 15G illustrates a structure of a video camera. The video camera in FIG. 15G includes a main body 961, a display portion 962, a housing 963, an external connection port 964, a remote control receiving portion 965, an image receiving portion 966, a battery 967, an audio input portion 968, operation keys 969, and the like. The above-described display device can be applied to the display portion 962.

Figure 15H:
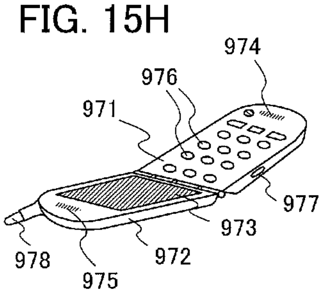

FIG. 15H illustrates a structure of a cellular phone. The cellular phone in FIG. 15H includes a main body 971, a housing 972, a display portion 973, an audio input portion 974, an audio output portion 975, operation keys 976, an external connection port 977, an antenna 978, and the like. The above-described display device can be applied to the display portion 973. Note that the display portion 973 displays white text on black screen so that current consumption of the cellular phone can be suppressed.

As shown in the examples in FIGS. 15A to 15H, the display device according to one embodiment of the present invention can be used for the display portions of a variety of electronic devices as above. By using the display device according to one embodiment of the present invention as the display portion of the electronic device, regardless of the number of pixel data input, desired image processing can be performed by using the input pixel data, whereby electronic devices capable of clear display can be provided.

Note that this embodiment can be combined with any of the other embodiments as appropriate.

This application is based on Japanese Patent Application serial No. 2008-327281 filed with Japan Patent Office on Dec. 24, 2008, the entire contents of which are hereby incorporated by reference.

What is claimed is:

1. An image processing circuit comprising:

a data adjustment circuit configured for sequentially outputting (X×Y) (X and Y are natural numbers) pieces of pixel data corresponding to respective pixels in X rows and Y columns as output data from pixel data corresponding to pixels in a first row to pixel data corresponding to pixels in each row and outputting (K−Y) (K is a natural number greater than Y) pieces of dummy data every time the pixel data corresponding to the pixels in one row is output;

a first line memory capable of storing K pieces of data and configured to store Y pieces of pixel data and (K−Y) pieces of dummy data input from the data adjustment circuit according to an input order for a certain period of time and to output the pieces of pixel data and the pieces of dummy data in the input order;

a second line memory capable of storing K pieces of data and configured to store Y pieces of pixel data and (K−Y) pieces of dummy data input from the first line memory according to the input order for a certain period of time and to output the pieces of pixel data and the pieces of dummy data in the input order;

an output timing control circuit; and an arithmetic circuit configured for storing the (X×Y) pieces of pixel data input from the first line memory and the second line memory through the output timing control circuit for a certain period of time and performing a filter process by using the stored (X×Y) pieces of pixel data, wherein the data adjustment circuit is configured to output the pieces of dummy data and the pieces of pixel data so that each of the first line memory and the second line memory store (K−Y) pieces of dummy data adjacent to each other and Y pieces of pixel data adjacent to each other.

2. The image processing circuit according to claim 1, wherein the data adjustment circuit includes a counting circuit for counting the number of the pixel data.

3. The image processing circuit according to claim 1, wherein the first line memory and the second line memory each includes sequential logic circuits of K stages electrically connected to each other.

4. The image processing circuit according claim 1, wherein the filter process is a process using one of a differential filter, an integral filter, and a Laplacian filter.

5. The image processing circuit according claim 1, wherein the filter process is a process using one of a moving average filter process, a Gaussian smoothing filter process, a Gaussian differential filter process, a high-emphasis filter process, an edge filter process and a mosaic process.

6. The image processing circuit according to claim 1, wherein the pieces of pixel data and the pieces of dummy data are digital data.

7. The image processing circuit according to claim 1, wherein the pieces of dummy data are any of input pixel data, data of only 0, data of only 1, and data representing a state of a signal during an interval situated between the sending of data into two adjacent columns.

8. The image processing circuit according to claim 1, wherein the pieces of dummy data are stored in a memory.

9. The image processing circuit according to claim 1, wherein an output of the data adjustment circuit is electrically connected to an input of the first line memory.

10. The image processing circuit according to claim 1, wherein an output of the first line memory is electrically connected to an input of the second line memory.

11. The image processing circuit according to claim 1, wherein an output of the first line memory and an output of the second line memory are electrically connected to an input of the output timing control circuit.

12. The image processing circuit according to claim 1, wherein an output of the output timing control circuit is electrically connected to an input of the arithmetic circuit.

13. A display device comprising:
- the image processing circuit described in claim 1;
- a control circuit electrically connected to the image processing circuit;
- a scan line driver circuit and a signal line driver circuit which are electrically connected to the control circuit; and
- a pixel portion including a pixel electrode electrically connected to the scan line driver circuit and the signal line driver circuit.

14. An electronic device comprising the display device described in claim 13 in a display portion.

15. The image processing circuit according to claim 1, further configured to input the (X×Y) pieces of pixel data in the arithmetic circuit and to not input the (K−Y) dummy data of each row in the arithmetic circuit.

16. The image processing circuit according to claim 1, wherein the output timing control circuit is configured to not output the dummy data of each row.

17. An image processing circuit comprising:
- a data adjustment circuit configured for sequentially outputting (X×Y) (X and Y are natural numbers) pieces of pixel data corresponding to respective pixels in X rows and Y columns as output data from pixel data corresponding to pixels in a first row to pixel data corresponding to pixels in each row and outputting (K−Y) (K is a natural number greater than Y) pieces of dummy data every time the pixel data corresponding to the pixels in one row is output;
- a first line memory capable of storing K pieces of data and configured to store Y pieces of pixel data and (K−Y) pieces of dummy data input from the data adjustment circuit according to an input order for a certain period of time and to output the pieces of pixel data and the pieces of dummy data in the input order;
- a second line memory capable of storing K pieces of data and configured to store Y pieces of pixel data and (K−Y) pieces of dummy data input from the first line memory according to the input order for a certain period of time and to output first the pieces of pixel data and the pieces of dummy data in the input order; and
- an output timing control circuit,
- wherein an output of the data adjustment circuit is electrically connected to an input of the first line memory,
- wherein an output of the first line memory is electrically connected to an input of the second line memory,
- wherein the output of the first line memory and an output of the second line memory are electrically connected to the output timing control circuit, and
- wherein the data adjustment circuit is configured to output the pieces of dummy data and the pieces of pixel data so that each of the first line memory and the second line memory store (K−Y) pieces of dummy data adjacent to each other and Y pieces of pixel data adjacent to each other.

18. The image processing circuit according to claim 17, wherein the output timing control circuit is configured to not output the (K−Y) dummy data of each row.

19. A display device comprising:
- the image processing circuit described in claim 17;
- a control circuit electrically connected to the image processing circuit;
- a scan line driver circuit and a signal line driver circuit which are electrically connected to the control circuit; and
- a pixel portion including a pixel electrode electrically connected to the scan line driver circuit and the signal line driver circuit.

* * * * *

UNITED STATES PATENT AND TRADEMARK OFFICE

CERTIFICATE OF CORRECTION

PATENT NO. : 8,860,738 B2
APPLICATION NO. : 12/639233
DATED : October 14, 2014
INVENTOR(S) : Masami Endo It is certified that error appears in the above-identified patent and that said Letters Patent is hereby corrected as shown below:

In the Claims

Column 28, line 3, in claim 16, before "dummy data" insert --(K-Y)--.

Signed and Sealed this
Twenty-first Day of July, 2015

Michelle K. Lee
*Director of the United States Patent and Trademark Office*